(12) United States Patent
Kondo et al.

(10) Patent No.: US 10,275,938 B2
(45) Date of Patent: Apr. 30, 2019

(54) IMAGE PROCESSING APPARATUS AND IMAGE PROCESSING METHOD

(71) Applicant: SONY CORPORATION, Tokyo (JP)

(72) Inventors: Masao Kondo, Kanagawa (JP);
Hirotaka Tako, Kanagawa (JP);
Yusuke Tsujita, Kanagawa (JP);
Daisuke Shiono, Tokyo (JP); Isao Nakajima, Tokyo (JP); Kenichi Yamaura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/551,177

(22) PCT Filed: Jan. 19, 2016

(86) PCT No.: PCT/JP2016/051430
§ 371 (c)(1),
(2) Date: Aug. 15, 2017

(87) PCT Pub. No.: WO2016/136332
PCT Pub. Date: Sep. 1, 2016

(65) Prior Publication Data
US 2018/0040156 A1 Feb. 8, 2018

(30) Foreign Application Priority Data

Feb. 27, 2015 (JP) ................. 2015-039620

(51) Int. Cl.
*G06T 15/60* (2006.01)
*G06F 3/0481* (2013.01)
(Continued)

(52) U.S. Cl.
CPC .............. *G06T 15/60* (2013.01); *G06F 3/011* (2013.01); *G06F 3/0354* (2013.01);
(Continued)

(58) Field of Classification Search
CPC .. G06F 3/03547; G06F 3/0481; G06F 3/0484; G06T 15/506; G06T 19/20; H04N 9/3147; H04N 9/3179; H04N 9/3194
See application file for complete search history.

(56) References Cited

U.S. PATENT DOCUMENTS

2001/0001767 A1   5/2001  Miyamoto et al.
2008/0316145 A1  12/2008  May
(Continued)

FOREIGN PATENT DOCUMENTS

JP      11-144077 A     5/1999
JP    2012-208439 A    10/2012
(Continued)

OTHER PUBLICATIONS

International Search Report and Written Opinion of PCT Application No. PCT/JP2016/051430, dated Mar. 22,016, 02 pages of English Translation and 07 pages of ISRWO.

*Primary Examiner* — Robert J Craddock
(74) *Attorney, Agent, or Firm* — Chip Law Group

(57) ABSTRACT

An image processing apparatus including: a real space information input portion into which information about a real space is input; and a signal generating portion that generates a control signal for an image that creates a virtual shadow effect in the real space on the basis of the information about the real space.

16 Claims, 24 Drawing Sheets

(51) Int. Cl.
    *G06F 3/0484*         (2013.01)
    *G06F 3/0354*         (2013.01)
    *G06T 15/50*          (2011.01)
    *G06T 19/20*          (2011.01)
    *H04N 9/31*           (2006.01)
    *G06F 3/01*            (2006.01)
    *G06F 3/042*          (2006.01)

(52) U.S. Cl.
    CPC ........ *G06F 3/03547* (2013.01); *G06F 3/0425* (2013.01); *G06F 3/0481* (2013.01); *G06F 3/0484* (2013.01); *G06T 15/506* (2013.01); *G06T 19/20* (2013.01); *H04N 9/3147* (2013.01); *H04N 9/3179* (2013.01); *H04N 9/3194* (2013.01); *G06T 2200/04* (2013.01); *G06T 2200/24* (2013.01)

(56) References Cited

U.S. PATENT DOCUMENTS

| | | |
|---|---|---|
| 2010/0315413 A1 | 12/2010 | Izadi et al. |
| 2011/0234631 A1 | 9/2011 | Kim et al. |
| 2013/0227609 A1 | 8/2013 | Winter et al. |

FOREIGN PATENT DOCUMENTS

| | | |
|---|---|---|
| JP | 2013-517579 A | 5/2013 |
| JP | 2013-182618 A | 9/2013 |
| JP | 2014-203326 A | 10/2014 |
| WO | 2010/148155 A2 | 12/2010 |

FIG.13
(OUTPUT IMAGE FROM IMAGE OUTPUT UNIT 150a)
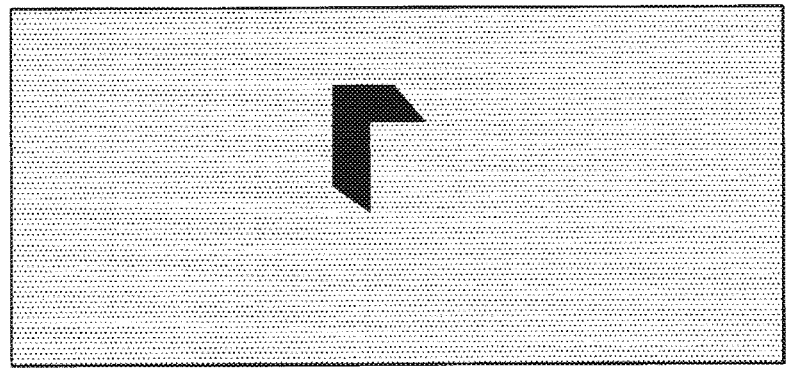
(OUTPUT IMAGE FROM IMAGE OUTPUT UNIT 150b)
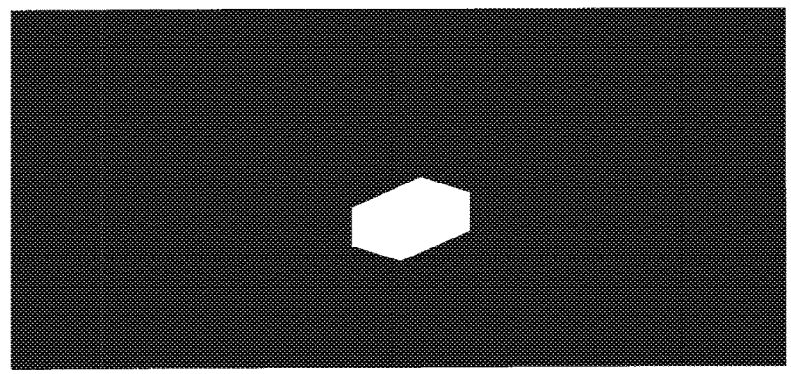
(ACTUAL APPEARANCE)
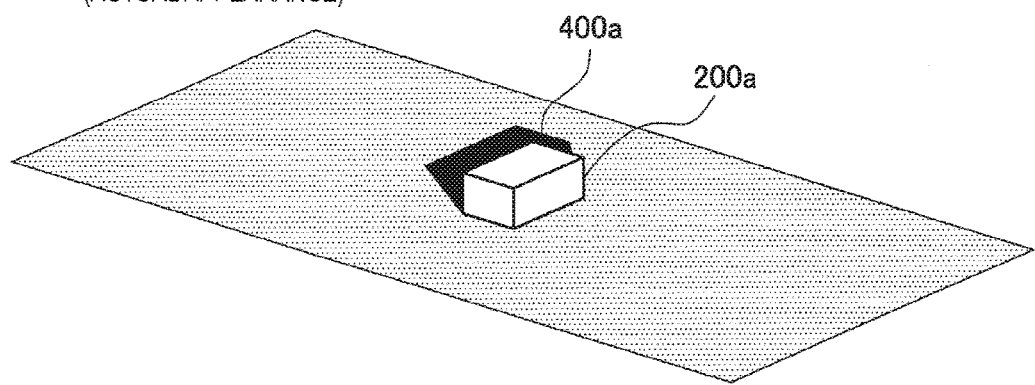

FIG.15
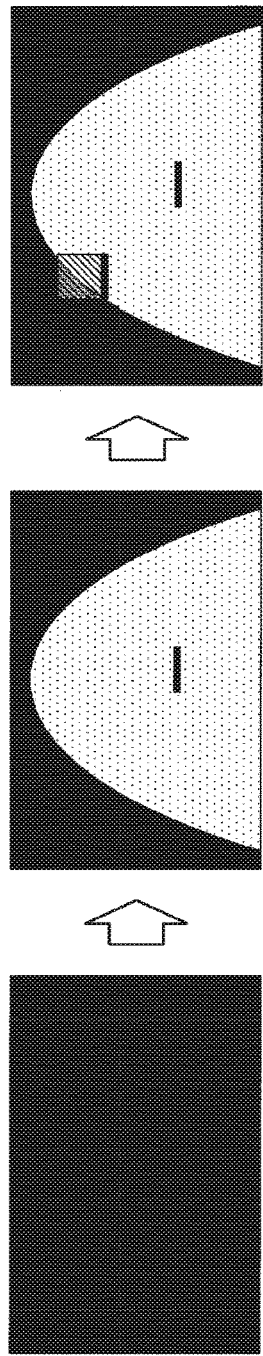
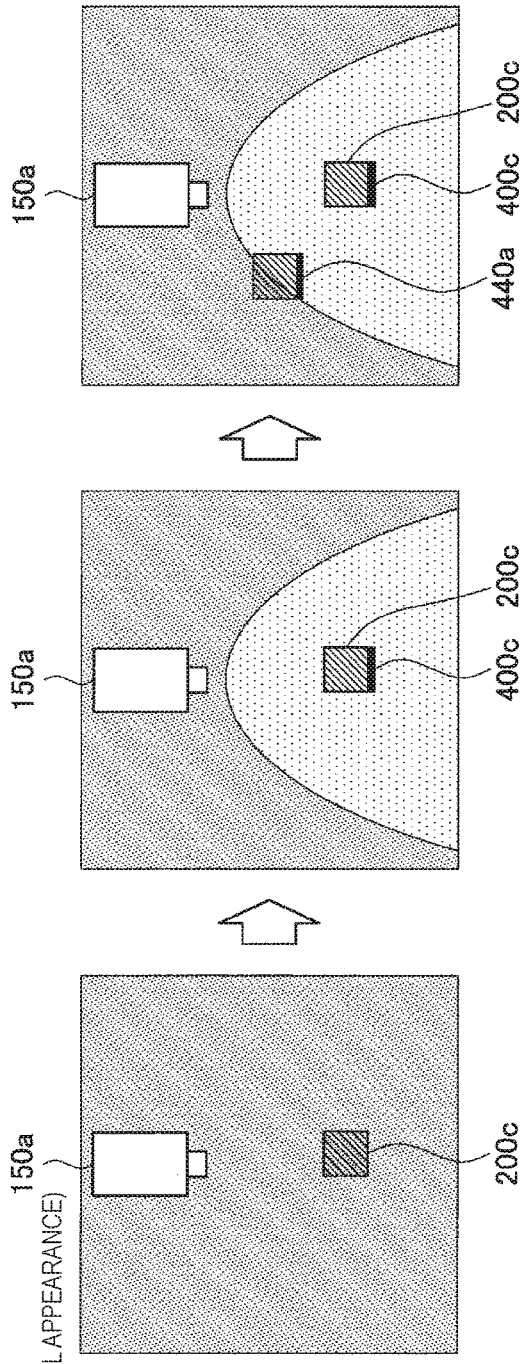

FIG.17
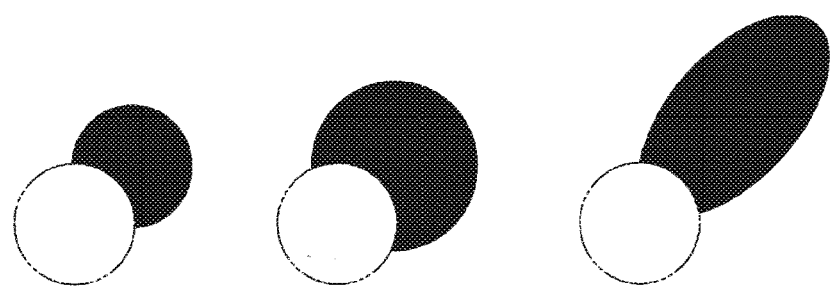
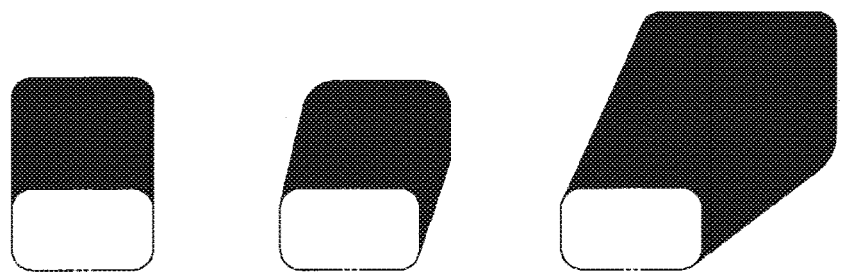
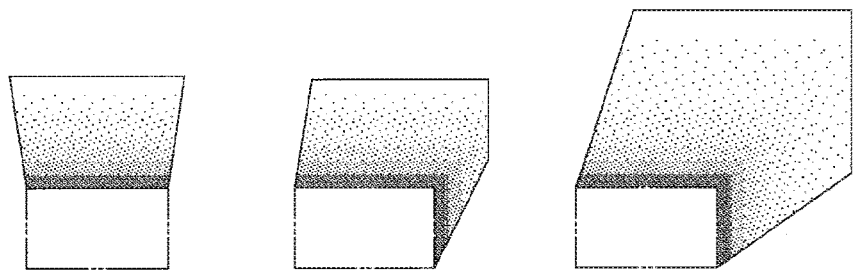
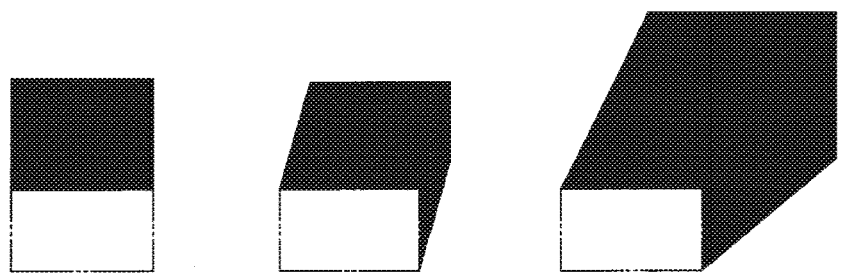

FIG.19
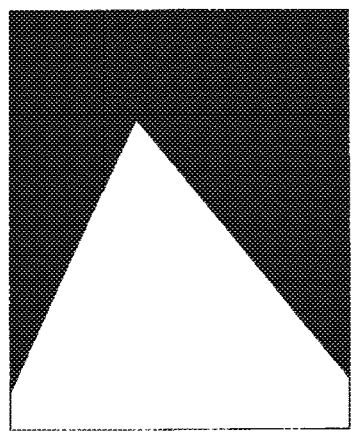
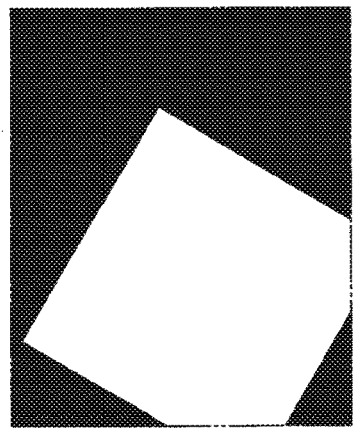
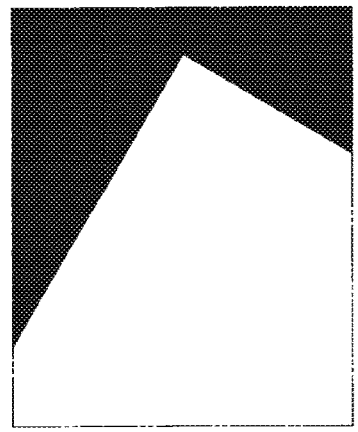

FIG.20
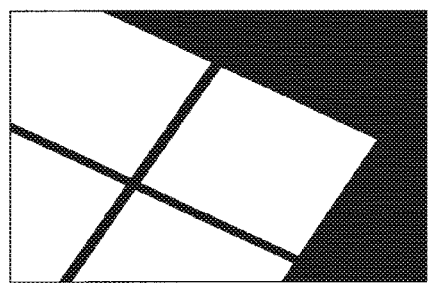
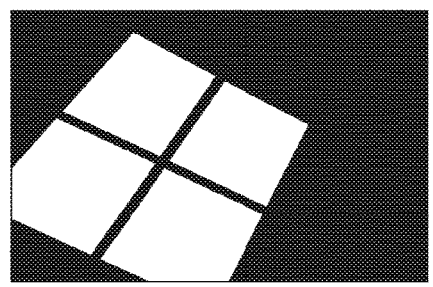
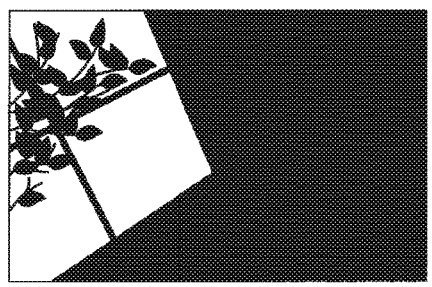
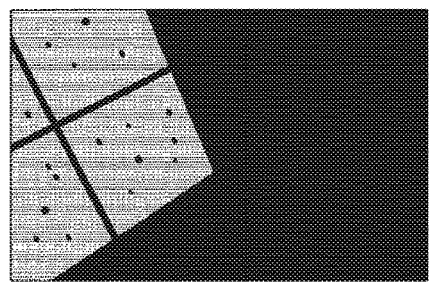

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/051430 filed on Jan. 19, 2016, which claims priority benefit of Japanese Patent Application No. JP 2015-039620 filed in the Japan Patent Office on Feb. 27, 2015. Each of the above-referenced applications is hereby incorporated herein by reference in its entirety.

TECHNICAL FIELD

The present disclosure relates to an image processing apparatus, an image processing method, and a program.

BACKGROUND ART

Apparatuses that display content, such as a projector and a touch panel display, are in widespread use. Patent Literature 1, for example, describes technology that displays content such as an icon by projecting the content using a projector, in accordance with the position of a detected object. According to this technology, even if there is an object between a projection unit and a body that is projected upon, good visibility is able to be obtained by performing image processing so that the content is not projected on the object as it is.

CITATION LIST

Patent Literature

Patent Literature 1: JP 2012-208439A

DISCLOSURE OF INVENTION

Technical Problem

When an apparatus such as a projector or a touch panel display attempts to display content in this way, the displayed content may not seem real to the user, depending on the condition of the real space where the content is trying to be displayed.

Therefore, the present disclosure proposes an image processing apparatus, an image processing method, and a program which are novel and improved, and which make more realistic rendering possible.

Solution to Problem

According to the present disclosure, there is provided an image processing apparatus including: a real space information input portion into which information about a real space is input; and a signal generating portion that generates a control signal for an image that creates a virtual shadow effect in the real space on the basis of the information about the real space.

Further, according to the present disclosure, there is provided an image processing method including: inputting information about a real space; and causing a processor to generate a control signal for an image that creates a virtual shadow effect, on the basis of the information about the real space.

Further, according to the present disclosure, there is provided a program that causes a computer to perform: a process of inputting information about a real space; and a process of generating a control signal for an image that creates a virtual shadow effect, on the basis of the information about the real space.

Advantageous Effects of Invention

According to the present disclosure as described above, more realistic rendering is possible.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is an explanatory view illustrating rendering according to a third specific example.

FIG. 15 is an explanatory view illustrating rendering according to a fourth specific example.

FIG. 17 is an explanatory view illustrating a variation of a virtual shadow effect according to a first modified example.

FIG. 19 is an explanatory view illustrating a variation of a virtual light source according to a second modified example.

FIG. 20 is an explanatory view illustrating a variation of a virtual light source according to a second modified example.

MODE(S) FOR CARRYING OUT THE INVENTION

Figure 1:
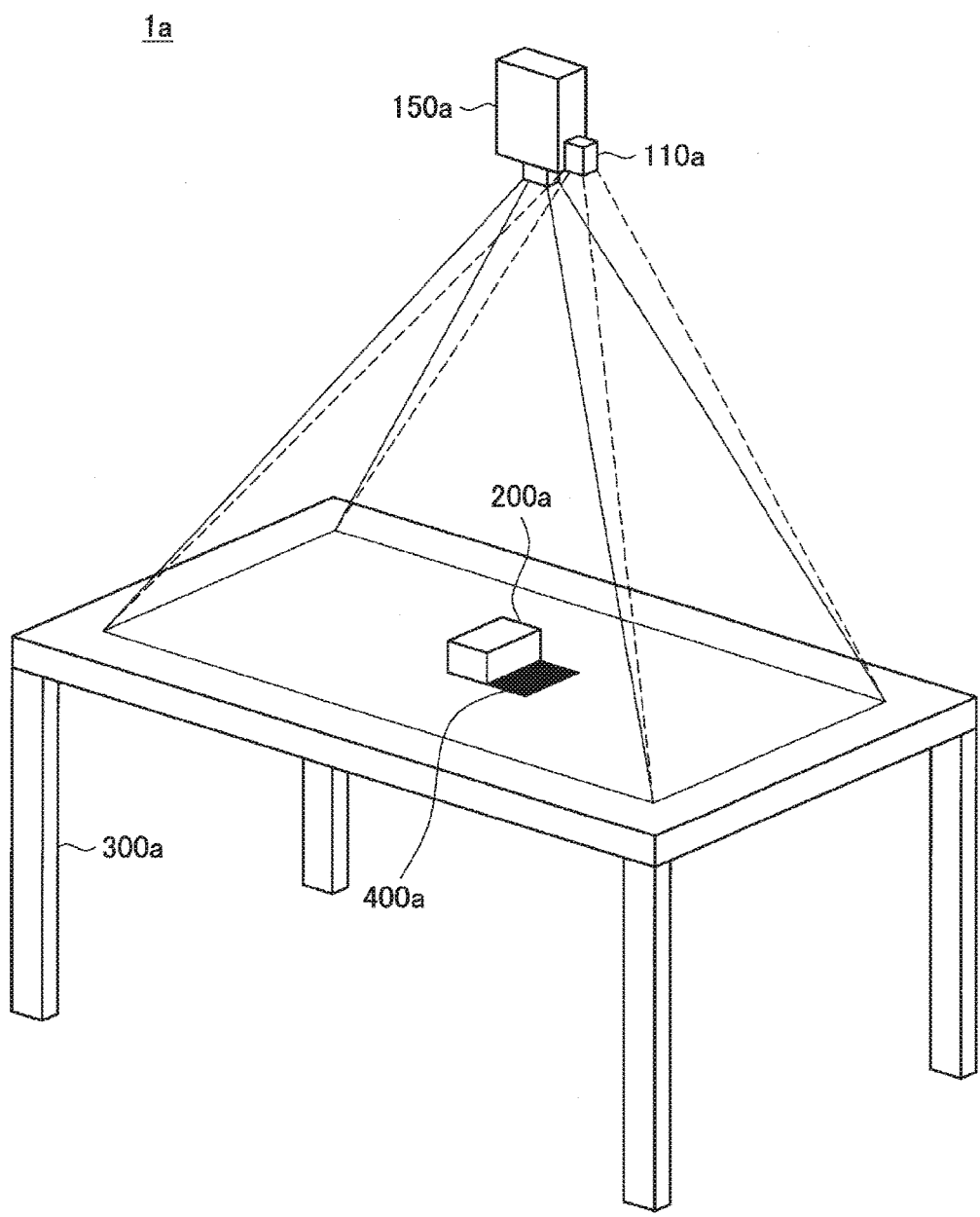
FIG. 1 is an explanatory view illustrating a configuration example of an image processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The description will be given in the following order.
<<1. Outline of image processing system>>
 <1-1. System configuration example>
 <1-2. Functional configuration example>
 <1-3. Operational example>
<<2. Specific examples of rendering>>
 <2-1. First specific example>
 <2-2. Second specific example>
 <2-3. Third specific example>
 <2-4. Fourth specific example>
<<3. Modified examples>>
 <3-1. First modified example>
 <3-2. Second modified example>
 <3-3. Third modified example>
<<4. Hardware configuration example>>
<<5. Summary>>
<<1. Outline of Image Processing System>>
 <1-1. System Configuration Example>

First, a configuration example of an image processing system according to an embodiment of the present disclosure will be described with reference to the drawings. FIG. 1 is an explanatory view illustrating a configuration example of an image processing system according to an embodiment of the present disclosure.

As shown in FIG. 1, an image processing system 1a according to an embodiment of the present disclosure includes a sensor unit 110a and an image output unit 150a. The image processing system 1a according to the embodiment of the present disclosure shown in FIG. 1 is a system that displays, on a top surface of a table 300a, an image that creates a virtual shadow effect on the top surface of the table 300a, on the basis of information about the top surface of the table 300a. The object on which the image is displayed with the image processing system 1a is not limited to a table, and may also be a floor or a wall.

The sensor unit 110a is a device that senses a real space where the virtual shadow effect is created by the image processing system 1a. For example, the sensor unit 110a in FIG. 1 may sense the top surface of the table 300a, and the color and depth of an object on the table 300a. In the example shown in FIG. 1, the sensor unit 110a is provided suspended from a ceiling, for example, above the table 300a. That is, the sensor unit 110a is provided away from the table 300a on which the image is displayed. A camera that captures an image of the table 300a, or a stereo camera capable of capturing an image of the table 300a with two cameras and sensing depth information in the depth direction, for example, may be used as the sensor unit 110a. Also, the sensor unit 110a may include a plurality of the cameras or stereo cameras or the like described above.

If a camera that captures an image of the table 300a is used as the sensor unit 110a, the image processing system 1a is able to detect an object (such as an object 200a in FIG. 1) placed on the table 300a, by analyzing the image captured by the camera. Also, if a stereo camera is used as the sensor unit 110a, a visible light camera or an infrared camera, for example, may be used as the stereo camera. By using a stereo camera as the sensor unit 110a, the sensor unit 110a can sensor the depth information. The image processing system 1a is able to detect an object on the table 300a, recognize a three-dimensional shape of the object, detect a hand, and detect an operation by a user, for example, by analyzing the depth information acquired by the sensor unit 110a. In the description below, a case in which a touch operation is used as an operation by the user will be described. Also, in the description below, the act of the user bringing an operating body such as a hand into contact with, or close to, a body on which an image is displayed (e.g., the table 300a or the object 200a in FIG. 1) may also collectively be referred to simply as a "touch."

If the sensor unit 110 includes an infrared camera, the sensor unit 110a may include an infrared emitting unit that emits a predetermined infrared pattern (e.g., a Voronoi pattern). According to this configuration, even if the table 300a lacks a feature such as a pattern, the image processing system 1a is able to acquire more accurate depth information by analyzing the infrared pattern captured by the infrared camera.

An image output unit 150a is a device that displays an image that creates a virtual shadow effect in a real space (e.g., on the table 300a and the space above the table 300a in FIG. 1), on the basis of the sensing results of the sensor unit 110 or information obtained from an analysis of the sensing results of the sensor unit 110. In the example shown in FIG. 1, the image output unit 150a is provided suspended from a ceiling, for example, above the table 300a. If a projector is used as the image output unit 150a, the image output unit 150a casts an image onto the top surface of the table 300a.

With the image processing system 1a shown in FIG. 1, the sensor unit 110a and the image output unit 150a are facing in generally the same direction, such that the area of the real space where sensing by the sensor unit 110a is possible substantially overlaps with the area where the image output unit 150a outputs the image. Also, the image processing system 1a may also have a function of converting from a coordinate system of the sensor unit 110a to a coordinate system of the image output unit 150a. According to this configuration, the image output unit 150a is able to output an image such that a virtual shadow corresponding to the object 200a is displayed near the object 200a, for example, on the basis of the sensing results of the sensor unit 110a.

The arrangement of the sensor unit 110 and the image output unit 150 according to the present disclosure is not limited to the arrangement described above.

In the example shown in FIG. 1, a virtual shadow 400a is part of the image output by the image output unit 150a, and a virtual shadow effect is created on the table 300a and the object 200a by the virtual shadow 400a.

When it is desirable to create a shadow effect in an intended position, one conceivable method is to use a plurality of lighting devices and adjust the position and brightness of each lighting device such that the shadow of the object 200a falls in the position of the virtual shadow 400a, for example. However, even in a case in which it is desirable to hide the lighting device in the surroundings, there may be cases in which a plurality of lighting devices end up being arranged in noticeable positions, depending on the desired shadow effect. Also, a plurality of lighting devices, or a mechanism for adjusting the position of a lighting device, may make the equipment complex. In contrast, with the image processing system 1a shown in FIG. 1, it is possible to create the virtual shadow 400a by the image output by the image output unit 150 provided above the table 300a. Also, if there is a desire to move the shadow as with animation, one conceivable method is to move a lighting device that serves as a light source, for example, but doing so may also make the equipment complex. In contrast, with the image processing system 1a shown in FIG. 1, it is possible to move the virtual shadow 400a by animating the region corresponding to the virtual shadow 400a in the image output by the image output unit 150a. As described above, according to the image processing system 1a, it is possible to create an intended shadow effect with equipment that is simpler and easier to hide.

Figure 2:
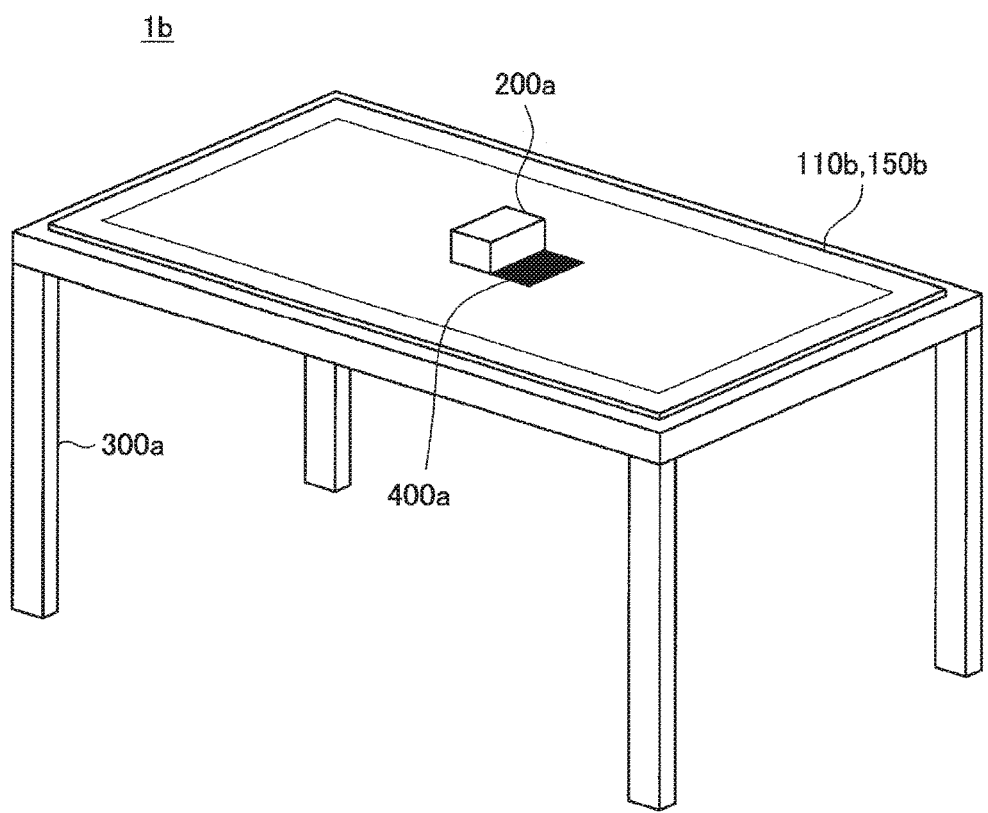
FIG. 2 is an explanatory view illustrating a configuration example of an image processing system according to an embodiment of the present disclosure.
Figure 3:
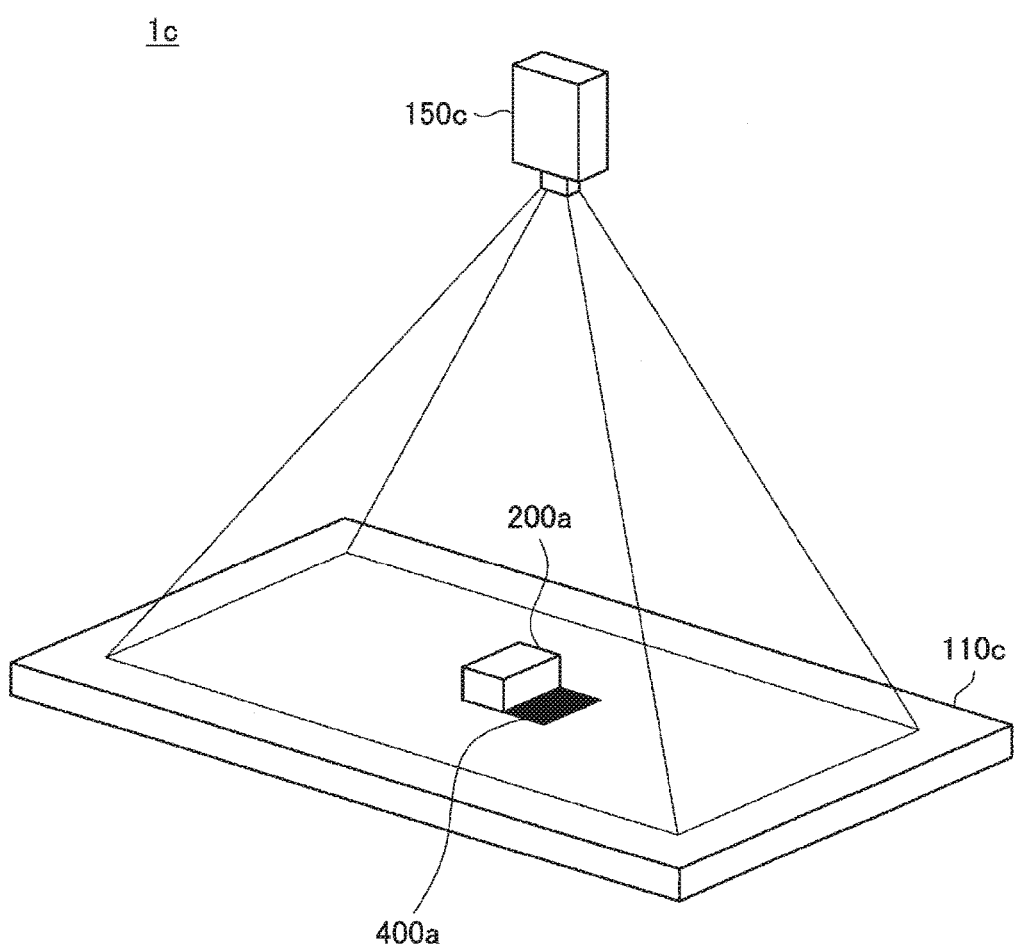
FIG. 3 is an explanatory view illustrating a configuration example of an image processing system according to an embodiment of the present disclosure.

In the present disclosure, the mode of the image processing system is not limited to the mode shown in FIG. 1. FIGS. 2 and 3 are explanatory views illustrating examples of yet other modes of the image processing system according to an embodiment of the present disclosure.

FIG. 2 is an explanatory view illustrating a configuration example of an image processing system 1b according to an embodiment of the present disclosure. FIG. 2 shows a touch panel display that includes a pressure sensor, placed on the table 300a. In such a case, a sensor unit 110b and an image output unit 150b may be configured as a touch panel display that includes a pressure sensor. In the image processing system 1b shown in FIG. 2, the display surface for the image is a touch panel display. Also, the sensor unit 110b may detect the position of the object 200a on the display, the shape of a surface of the object 200a in contact with the display, and the touch position where the user touches the display, and the like, by sensing pressure. Further, with the image processing system 1b shown in FIG. 2, a camera that detects a three-dimensional shape of an object on the display, and an actual shadow on the display, and the like, may be provided above the touch panel display, similar to the image processing system 1a shown in FIG. 1.

FIG. 3 is an explanatory view illustrating a configuration example of an image processing system 1b according to an embodiment of the present disclosure. FIG. 3 shows a pressure sensor sheet placed on a floor. In such a case, a sensor unit 110c may be configured as a pressure sensor sheet. Also, an image output unit 150c may be provided above the sensor unit 110c, similar to the image processing system 1a shown in FIG. 1. In the image processing system 1c shown in FIG. 3, the display surface for the image is a pressure sensor sheet. Also, the sensor unit 110c may detect the position of the object 200a on the pressure sensor sheet, the shape of a surface of the object 200a in contact with the pressure sensor sheet, and the touch position where the user touches the pressure sensor sheet, and the like, by sensing pressure. Further, with the image processing system 1c shown in FIG. 3, a camera that detects a three-dimensional shape of an object on the display, and an actual shadow on the display, and the like, may be provided above the touch panel display, similar to the image processing system 1a shown in FIG. 1.

Heretofore, a system configuration example of an image processing system according to an embodiment of the present disclosure has been described. Continuing on, a functional configuration example of an image processing system according to an embodiment of the present disclosure will be described. In the description below, the configuration of an image processing system in which the display surface for the image, the sensor unit 110a, and the image output unit 150a are each provided independently, as shown in FIG. 1, unless otherwise noted, will be described as an example.

<1-2. Functional Configuration Example>

Figure 4:
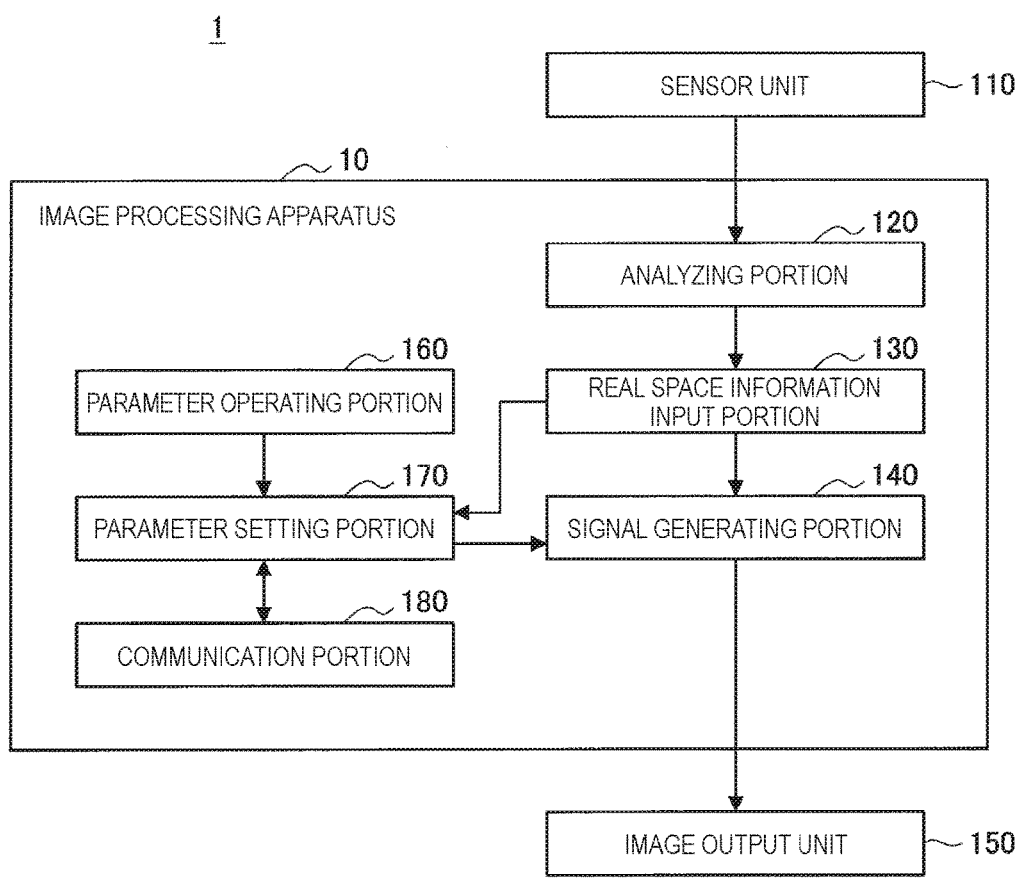
FIG. 4 is an explanatory view illustrating a functional configuration example of an image processing system according to an embodiment of the present disclosure.

FIG. 4 is an explanatory view illustrating a functional configuration example of an image processing system 1 according to an embodiment of the present disclosure.

As shown in FIG. 4, the image processing system 1 according to an embodiment of the present disclosure is an information processing system that includes a sensor unit 110, an image processing apparatus 10, and an image output unit 150. Also, the image processing apparatus 10 is an information processing apparatus that includes an analyzing portion 120, a real space information input portion 130, a signal generating portion 140, a parameter operating portion 160, a parameter setting portion 170, and a communication portion 180, as shown in FIG. 4.

The sensor unit 110 senses a real space where a virtual shadow effect is created by the image processing system 1. For example, the sensor unit 110 may sense color and depth in the real space. The sensing results of the sensor unit 110 are supplied to the analyzing portion 120.

The analyzing portion 120 functions as a real space information acquiring portion that analyzes the sensing results (information about color and depth and the like in the real space) of the sensor unit 110, and acquires information about the real space (real space information) such as object information (the three-dimensional shape, position, color, and the like of the object), the shape of a shadow in the real space, and operation information indicative of an operation by the user.

For example, when an image of the real space captured by the sensor unit 110 is acquired, the analyzing portion 120 may acquire the position and color of an object, and the shape of a shadow in the real space, and the like, by image analysis using a well-known background differencing technique or the like. Also, when depth information of the real space is acquired by the sensor unit 110, the analyzing portion 120 may detect a touch position on the basis of the positional relationship between the position of a hand acquired by well-known hand area detection technology and a display surface or an object in the real space. Also, when depth information of the real space is acquired by the sensor unit 110, the analyzing portion 120 may first detect an object region according to a well-known background differencing technique or the like, and then acquire the three-dimensional shape of the object on the basis of the depth information of the object.

Real space information acquired by the analyzing portion 120 analyzing the sensing results of the sensor unit 110 are inputted to the real space information input portion 130. The real space information inputted to the real space information input portion 130 is supplied to the signal generating portion 140 and the parameter setting portion 170. The real space information inputted to the real space information input portion 130 may also be supplied to a storing portion, not shown, and stored.

The signal generating portion 140 generates a control signal for a virtual shadow image that creates a virtual shadow effect in the real space, on the basis of the real space information. The control signal generated by the signal generating portion 140 is supplied to the image output unit 150. The control signal for an image generated by the signal generating portion 140 may be an image signal that is able to be directly replayed by the image output unit 150 (such as a so-called RGB signal), or data (such as HTML data) in which a picture or an image is obtained by rendering.

Also, the signal generating portion 140 may determine a virtual shadow effect corresponding to parameters of a virtual light source set by the parameter setting portion 170, described later, and generate a control signal for a virtual shadow image that creates the virtual shadow effect in the real space. For example, the signal generating portion 140 may simulate a shadow to be created in the real space when there is a light source having the light source parameters described above (e.g., a light source characteristic, the position of the light source, the direction of light emitted from the light source, the range of light emitted from the light source, the color of light emitted from the light source, and the brightness of light emitted from the light source), and determine the virtual shadow effect so that the shadow is reproduced in the real space.

Also, when the real space information includes object information relating to an object in the real space (such as the position, three-dimensional shape, and color of the object), the virtual shadow image may create a virtual shadow effect in accordance with the object information. For example, when the object information includes information indicative of the position of the object, the virtual shadow image may create a virtual shadow effect in accordance with the position of the object. Also, when the object information includes information indicative of the three-dimensional shape of the object, the virtual shadow image may create a virtual shadow effect in accordance with the three-dimensional shape of the object. For example, the signal generating portion 140 may simulate a shadow to be created in the real space by light from a virtual light source having specific light source parameters being emitted onto the object, and determine the virtual shadow effect so that the shadow is reproduced in the real space.

Also, the virtual shadow associated with the object (the shadow reproducing the shadow to be created in the real space as a result of light being emitted onto the object) may change on the basis of information indicative of the touch position by the user in the real space that is included in the real space information. For example, the virtual shadow effect may change when the user touches the object associated with the virtual shadow.

The change in the shadow effect is not limited to the change described above. For example, the virtual shadow effect may also change when the user touches the virtual shadow. Also, the virtual shadow effect may change independent of a touch by the user. For example, the size of the virtual shadow may change over time.

Also, when the image output unit 150 has a function of creating an illumination effect like a projector, the signal generating portion 140 may also generate a control signal for an image that is cast onto an object in the real space and creates an illumination effect. Also, when the size of the shadow corresponding to the object changes over time, the illumination effect may be an illumination effect in which the brightness changes in accordance with the change in the size of the virtual shadow.

Also, the virtual shadow image may create a virtual shadow effect at a position corresponding to a position of a shadow in the real space (a real shadow) that is created by an actual light source included in the real space information, on the basis of information indicative of the position of the real shadow. For example, the signal generating portion 140 may determine the virtual shadow effect so that a virtual shadow is created near the real shadow.

Also, when the image output unit 150 includes an illumination unit such as a projector, the signal generating portion 140 may also generate a control signal for controlling the illumination unit so as to illuminate an object in the real space in accordance with the three-dimensional shape of the object. When the illumination unit is a projector, the control signal may be an image signal.

The image output unit 150 outputs an image that creates a virtual shadow effect in the real space, on the basis of the control signal generated by the signal generating portion 140, and displays the image in the real space. The image output unit 150 may also output an image that is cast onto an object and creates an illumination effect, on the basis of the control signal generated by the signal generating portion 140.

The parameter operating portion 160 receives input from the user relating to the parameters of the virtual light source. Information indicative of the input from the user received by the parameter operating portion 160 is supplied to the parameter setting portion 170.

The parameter setting portion 170 sets the parameters of the virtual light source. For example, the parameter setting portion 170 may set the parameters of the virtual light source on the basis of the input from the user received by the parameter operating portion 160. The parameter setting portion 170 may also set the parameters of the virtual light source on the basis of information inputted from the communication portion 180, described later. Also, the parameter setting portion 170 may set the parameters of the virtual light source on the basis of the real space information supplied from the real space information input portion 130. The parameter setting portion 170 may also set the parameters of the virtual light source to change over time.

The parameters of the virtual light source set by the parameter setting portion 170 may include values related to, for example, a light source characteristic, the position of the light source, the direction of light emitted from the light source, the range of light emitted from the light source, the color of light emitted from the light source, and the brightness of light emitted from the light source. The parameters of the virtual light source set by the parameter setting portion 170 are supplied to the signal generating portion 140.

The communication portion 180 is connected to a communication network (such as the Internet), not shown, and information relating to the parameters of the virtual light source is acquired from an external server, not shown, that is connected to the communication network. For example, the communication portion 180 may acquire information relating to the weather at present or at an arbitrary time, and information relating to light source parameters released by general users. The information relating to the parameters of the virtual light source acquired by the communication portion 180 is supplied to the parameter setting portion 170.

<1-3. Operational Example>

Heretofore, a functional configuration example of the image processing system 1 according to an embodiment of the present disclosure has been described. Continuing on, an operational configuration example of the image processing system 1 according to an embodiment of the present disclosure will be described with reference to FIG. 5.

Figure 5:
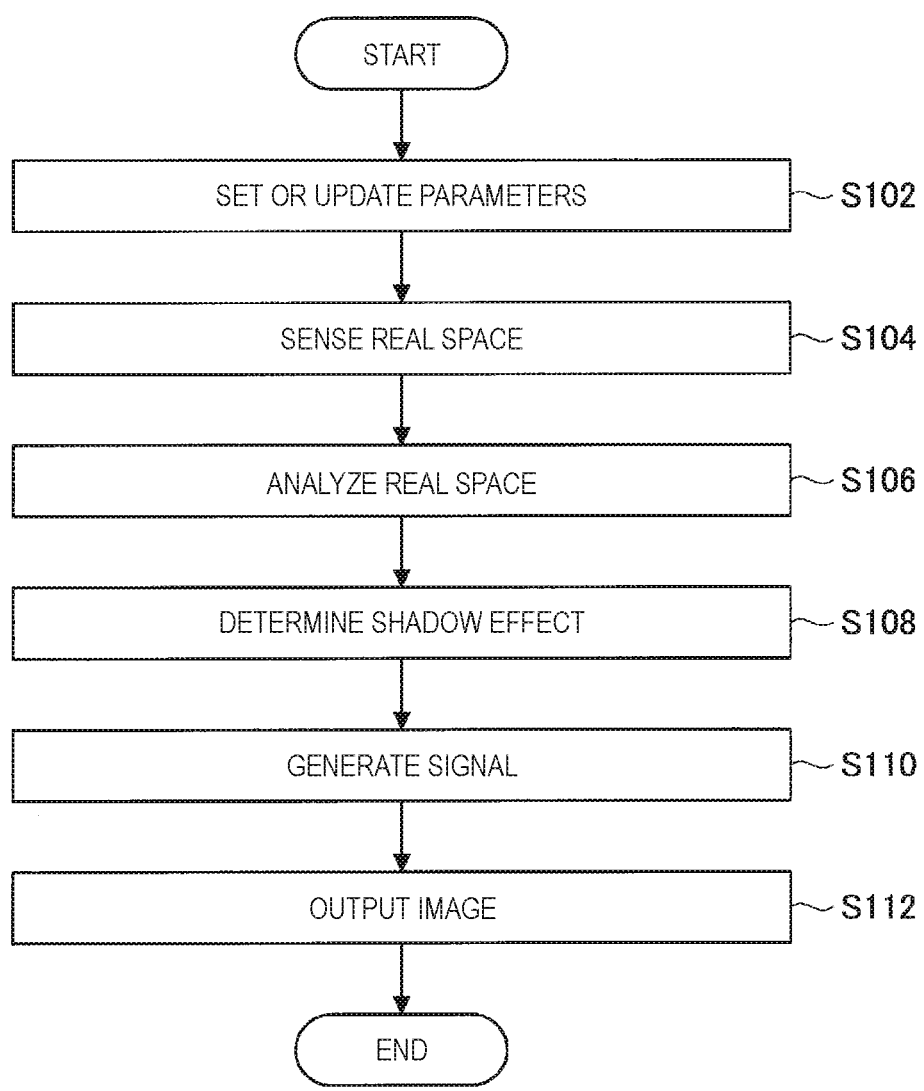
FIG. 5 is a flowchart illustrating an operational example of an image processing system according to an embodiment of the present disclosure.

FIG. 5 is a flowchart illustrating an operational example the image processing system 1 according to an embodiment of the present disclosure.

First, the parameter setting portion 170 sets the parameters of the virtual light source. (S102) When there are parameters that have already been set, the parameter setting portion 170 updates the virtual light source parameters. The parameters of the virtual light source that have been set or updated are supplied to the signal generating portion 140.

Continuing on, the sensor unit 110 senses the real space (S104). The sensing results from the sensor unit 110 are supplied to the analyzing portion 120. The analyzing portion 120 that has received the sensing results from the sensor unit 110 analyzes the sensing results, and acquires real space information such as the three-dimensional shape, position, and color of an object in the real space, the shape of a shadow in the real space, and a touch position by the user (S106). The acquired real space information is inputted to the real space information input portion 130 and then supplied to the signal generating portion 140.

Continuing on, the signal generating portion 140 determines a virtual shadow effect on the basis of the parameters of the virtual light source set by the parameter setting portion, and the real space information (S108). For example, the signal generating portion 140 may determine the virtual shadow effect by simulating a virtual shadow on the basis of the information about the virtual light source and the information about the object in the real space. Moreover, the signal generating portion 140 generates a control signal for an image that creates the determined virtual shadow effect (S110). The generated control signal for an image is supplied to the image output unit 150.

Finally, the image output unit 150 outputs an image that creates the virtual shadow effect to the real space, on the basis of the control signal for an image supplied from the signal generating portion 140, and displays the image in the real space (S112).

The operation described above may be repeated at regular intervals or continuously. For example, regarding the series of operations shown in FIG. 5, multiple frames of an image may be outputted by outputting one frame of an image (a picture) and repeating the series of operations shown in FIG. 5. Further, regarding the series of operations shown in FIG. 5, a multiple frame image may also be output.

<<2. Specific Examples of Rendering>>

Heretofore, an outline of the image processing system 1 according to an embodiment of the present disclosure has been described. Continuing on, specific examples of rendering able to be realized by the image processing system 1 described above will be described. A system configuration example will be described with each specific example, but the rendering according to the specific examples described below is able to be realized with any of the image processing systems 1 described with reference to FIGS. 1 to 4. Also, the specific examples described below may be carried out either alone or in combination.

<2-1. First Specific Example>

The image processing system 1 according to this specific example creates a virtual shadow effect in a real space in accordance with the three-dimensional shape of an object in the real space, and changes the virtual shadow effect in response to a user touching the object or a virtual shadow corresponding to the object. When creating a shadow effect such as the shadow effect described above with an actual light source and a shadow, it may be necessary to arrange a lighting device in a noticeable position in accordance with the shadow, even though it is desirable to hide the lighting device, or a mechanism to move a lighting device may be necessary, which would make the equipment complex. Therefore, the image processing system 1a according to this specific example creates a shadow effect such as the shadow effect described above without the position of the image output unit 150a relying on the shadow, and with simpler equipment, by setting a virtual light source and outputting an image that creates a virtual shadow effect in the real space. Hereinafter, this specific example will be described in detail with reference to FIGS. 6 to 9. FIGS. 6 to 9 are explanatory views illustrating rendering according to the first specific example.

Figure 6:
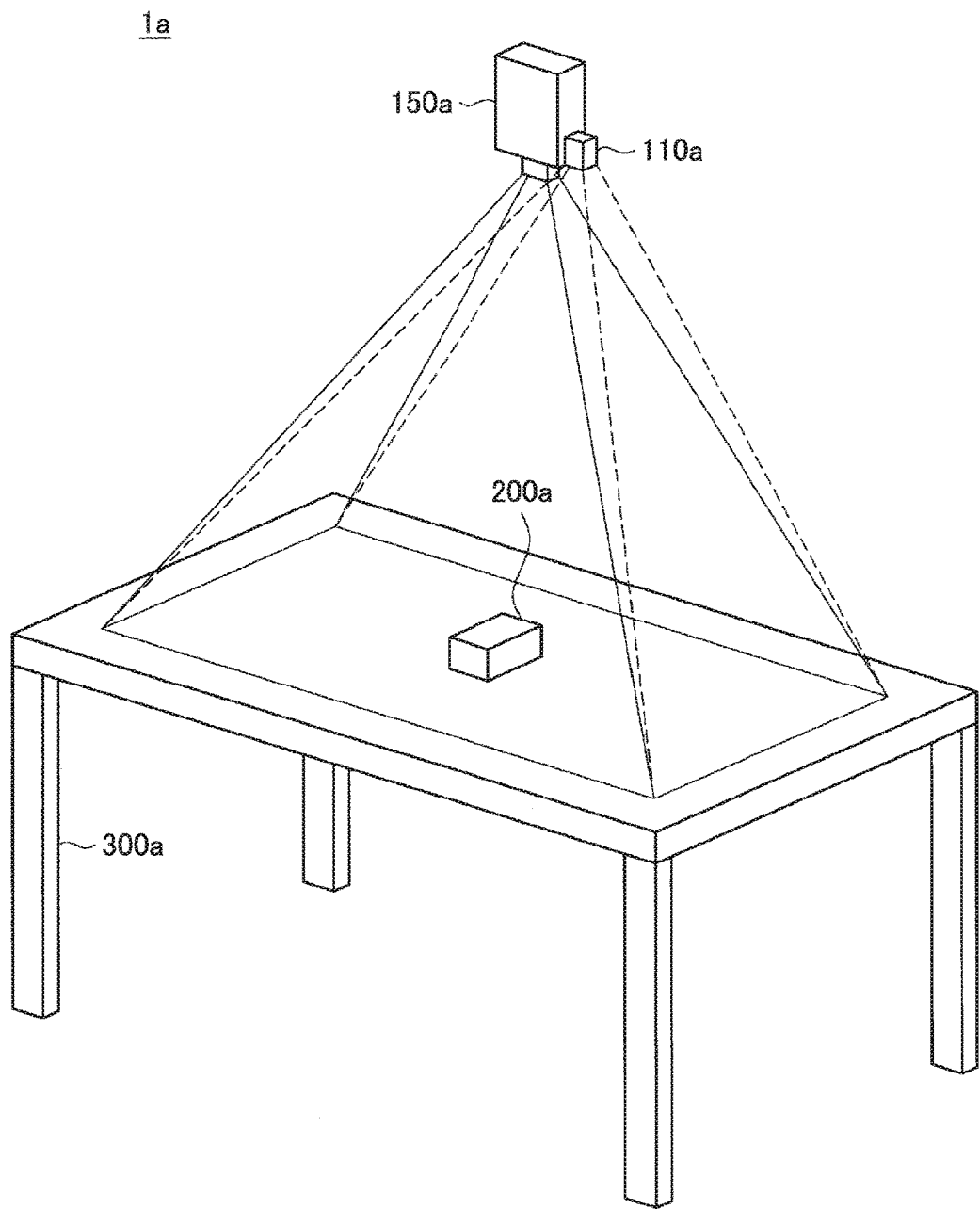
FIG. 6 is an explanatory view illustrating rendering according to a first specific example.

FIG. 6 is an explanatory view illustrating a system configuration example assumed in this specific example. As shown in FIG. 6, with the image processing system 1a assumed in this specific example, the sensor unit 110a and the image output unit 150a are provided above the table 300a, similar to the image processing system 1a shown in FIG. 1.

Figure 7:
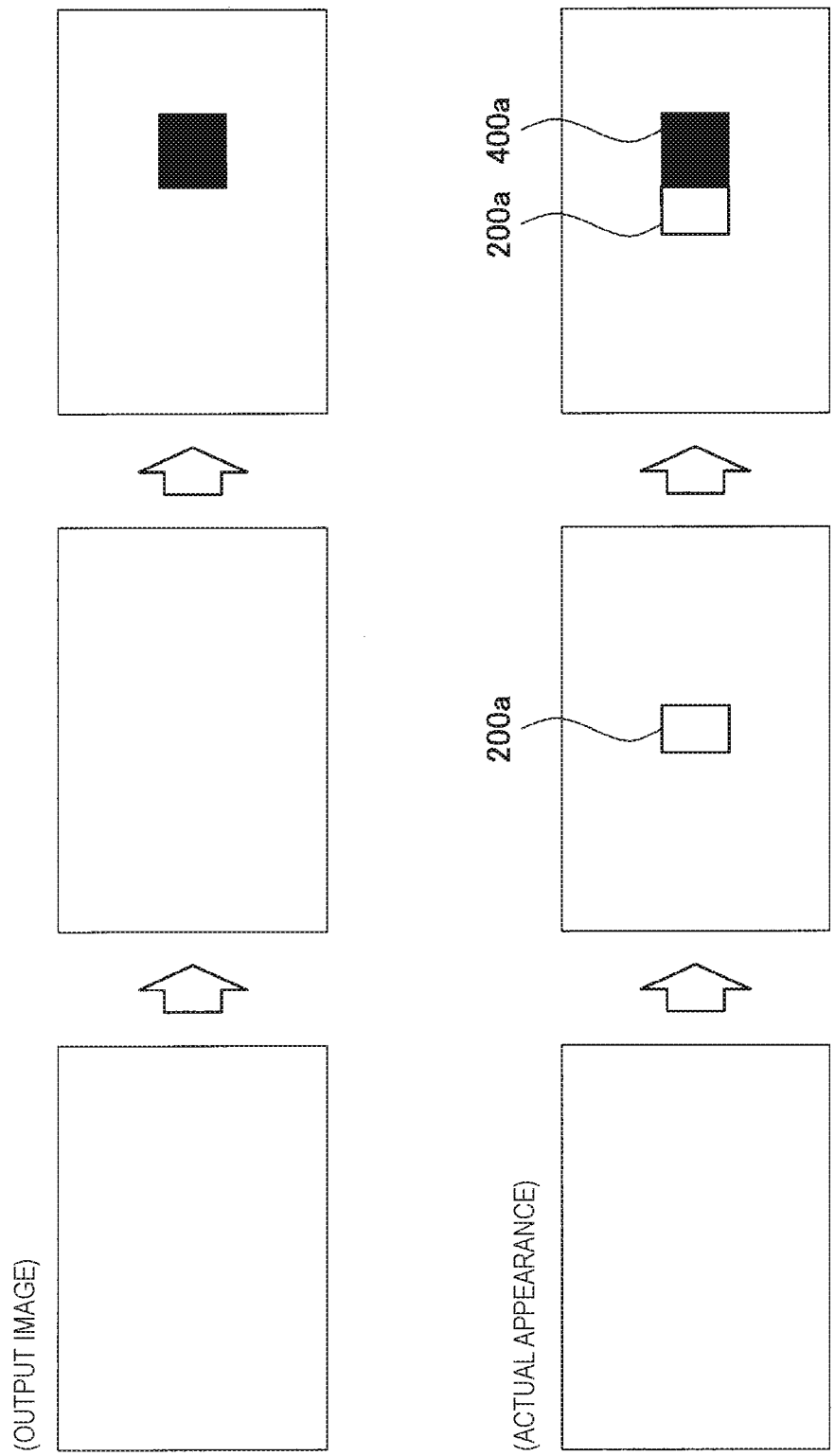
FIG. 7 is an explanatory view illustrating rendering according to a first specific example.

FIG. 7 is an explanatory view illustrating a modified example of output an image that is output by the image output unit 150a according to this specific example, and the actual appearance when the table 300a is viewed from above, when there is a change from a state in which nothing is on the table 300a to a state in which the object 200a is on the table 300a. As shown in FIG. 7, when there is no object on the table 300a, an object is not detected by the sensing with the sensor unit 110a or the real space analysis with the analyzing portion 120, so a virtual shadow is not included in the output image (the left column in FIG. 7). Then, when the object 200a is placed on the table 300a (in the middle column in FIG. 7), the object 200a is detected by the sensing with the sensor unit 110a and the real space analysis with the analyzing portion 120, and the position and three-dimensional shape of the object 200a are acquired. Then, the signal generating portion 140 generates a control signal for an image such that the virtual shadow 400a corresponding to the position and three-dimensional shape of the object 200a is displayed in the real space, as shown in the right column in FIG. 7, and the image output unit 150a outputs the image.

As shown in FIG. 7, highly realistic displaying and rendering is made possible by creating a virtual shadow effect in the real space that corresponds to the position and three-dimensional shape of the object 200a in the real space. For example, content may be displayed in the virtual shadow 400a. In this case, the content appears to be displayed in the shadow of the object in the real space, so a highly realistic user interface (UI) is realized.

For example, the content displayed in the virtual shadow 400a may be content relating to the object 200a corresponding to the virtual shadow 400a. For example, when the object 200a is a jacket of an audio compact disc (CD), the jacket may be recognized by the analyzing portion 120, and artist information or song list or the like of the audio CD may be displayed in the virtual shadow 400a. Also, if the object 200a is a communicable device (such as a smartphone), the device and the communication portion 180 may communicate, and an operation menu or content in the device, and information notified to the device (e.g., mail reception information) and the like may be displayed in the virtual shadow 400a.

If the content is displayed in the virtual shadow 400a, a touch operation by the user with respect to the content may be detected by the analyzing portion 120, and the displayed content may be changed in accordance with the touch operation. For example, when the content is displayed together with a scroll bar in the virtual shadow 400a corresponding to a non-device such as a jacket of an audio CD, an operation with respect to the scroll bar may be detected, and the content displayed in the virtual shadow 400a may be scrolled. Also, when the content is displayed in the virtual shadow 400a corresponding to a communicable device such as a smartphone, information relating to a touch operation by the user with respect to the content may be transmitted to the device from the communication portion 180, and the smartphone may be operated.

The processing by the image processing system 1a in response to a touch operation with respect to the virtual shadow 400a is not limited to the processing described above. For example, the virtual shadow effect that the output image output by the image output unit 150a creates in the real space may also change when the user touches the virtual shadow 400a.

Figure 8:
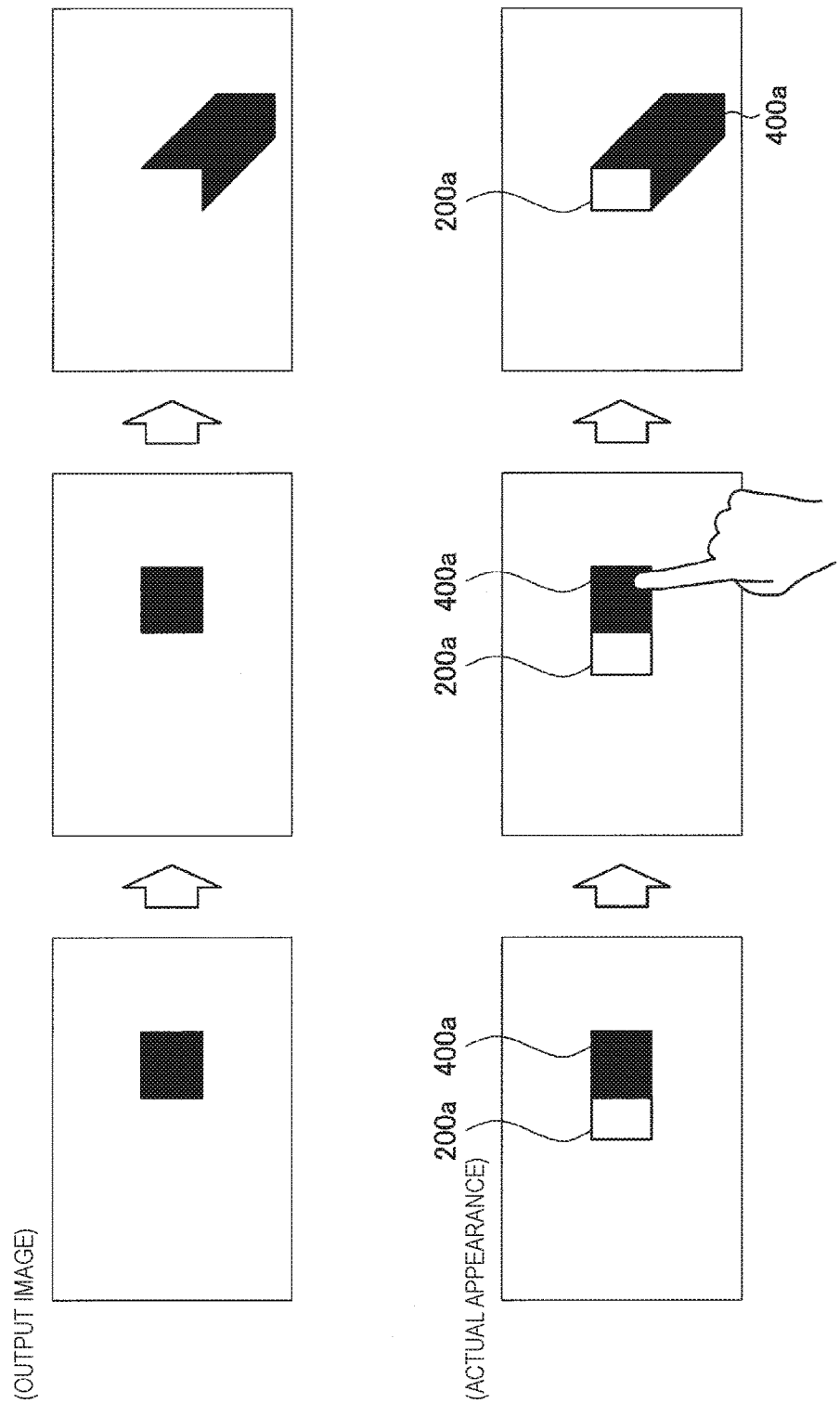
FIG. 8 is an explanatory view illustrating rendering according to a first specific example.

FIG. 8 is an explanatory view illustrating a modified example of an output image that is output by the image output unit 150a according to this specific example, and the actual appearance when the table 300a is viewed from above, when the virtual shadow effect changes in response to the user touching the virtual shadow 400a. When the virtual shadow 400a corresponding to the object 200a is displayed (the left column in FIG. 8) and the user touches the virtual shadow 400a (the middle column in FIG. 8), the touching of the virtual shadow 400a is detected by the analyzing portion 120, and the shape of the virtual shadow 400a changes as shown in the right column in FIG. 8. The change in the shape of the virtual shadow 400a may be a change that accompanies a change in the position of the virtual light source, or may be brought about by the parameter setting portion 170 updating the parameters of the virtual light source on the basis of information indicative of the touch position by the user. Also, if content is displayed in the virtual shadow 400a, the content displayed in the virtual shadow 400a may be changed in accordance with a change in the shape of the virtual shadow 400a.

Also, for example, the virtual shadow effect that the output image output by the image output unit 150a creates in the real space may also change when the user touches the object 200a that corresponds to the virtual shadow 400a, in the same manner as described above.

Figure 9:
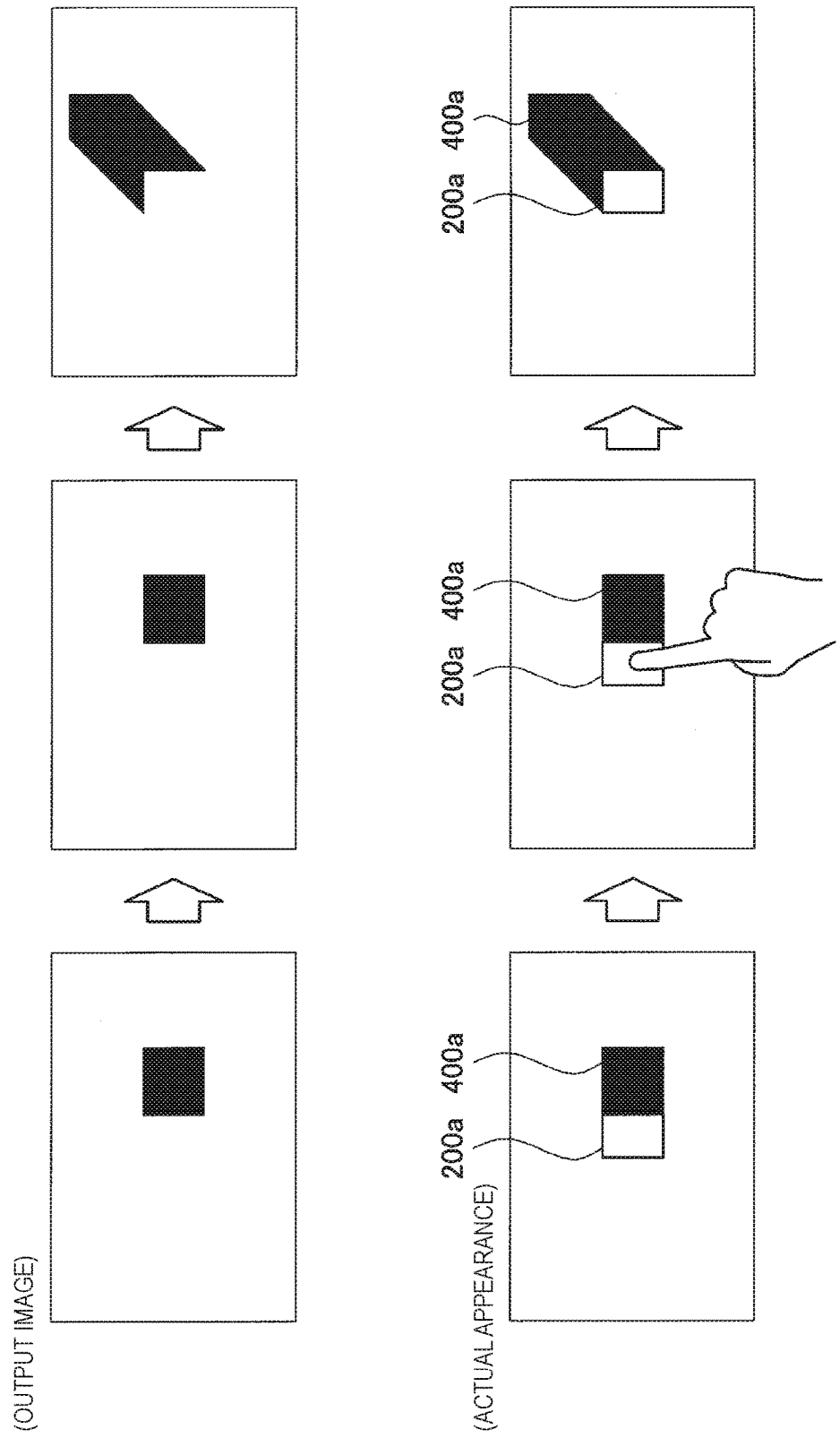
FIG. 9 is an explanatory view illustrating rendering according to a first specific example.

FIG. 9 is an explanatory view illustrating a modified example of an output image that is output by the image output unit 150a according to this specific example, and the actual appearance when the table 300a is viewed from above, when the virtual shadow effect changes in response to the user touching the object 200a. When the virtual shadow 400a corresponding to the object 200a is displayed (the left column in FIG. 9) and the user touches the object 200a (the middle column in FIG. 9), the touching of the object 200a is detected by the analyzing portion 120, and the shape of the virtual shadow 400a changes as shown in the right column in FIG. 9. When the object 200a is a device (such as a smartphone) that can communicate and detect a touch operation, the touch operation with respect to the object 200a may be acquired by the image processing system 1a by the touch operation detected by the device being transmitted to the communication portion 180.

<2-2. Second Specific Example>

Figure 10:
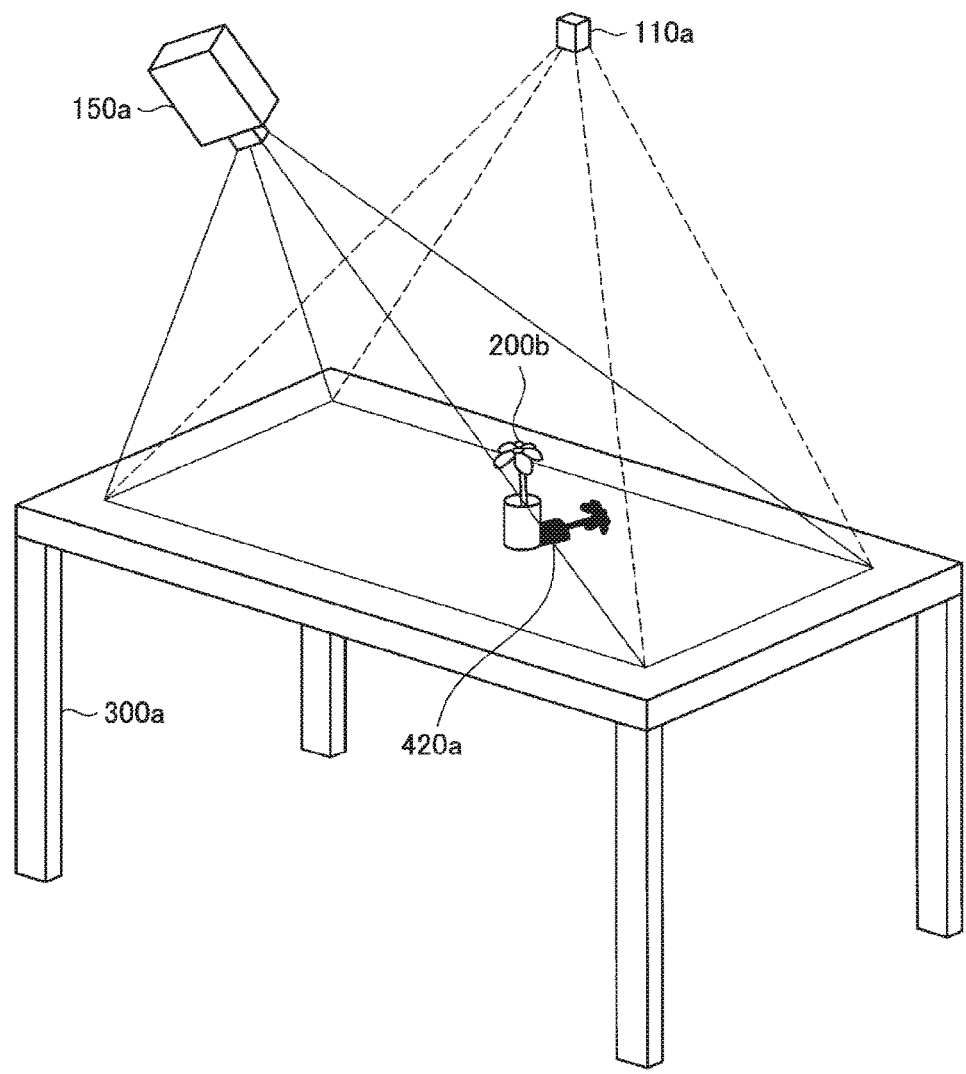
FIG. 10 is an explanatory view illustrating rendering according to a second specific example.
Figure 11:
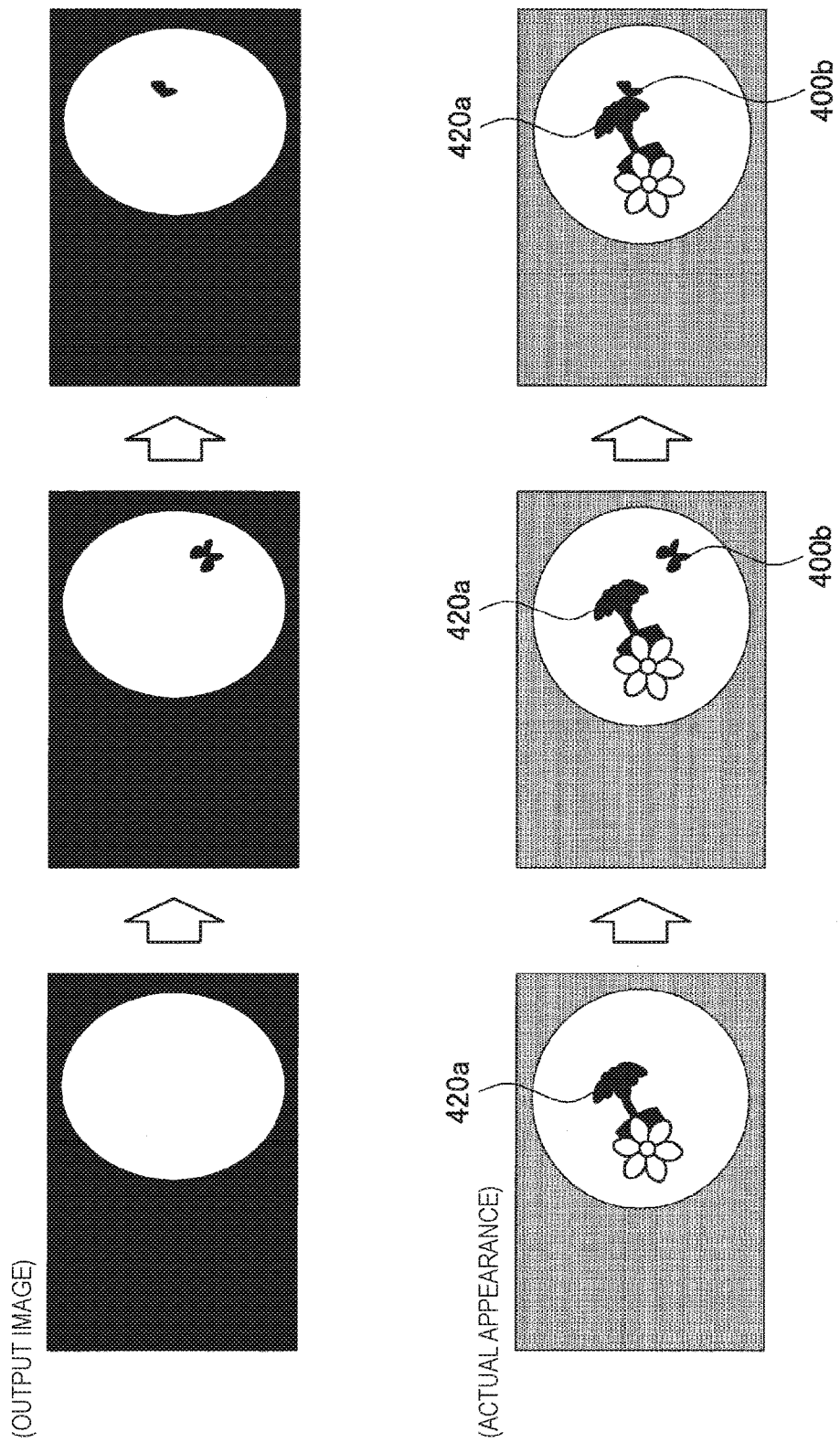
FIG. 11 is an explanatory view illustrating rendering according to a second specific example.

The image processing system 1 according to this specific example creates a virtual shadow effect at a position corresponding to the position of a shadow in the real space created by an actual light source. Displaying a virtual shadow that corresponds to a shadow created by an actual light source makes highly realistic rendering possible by giving the user the impression that a nonexistent object corresponding to a virtual shadow actually exists in the real space. Hereinafter, this specific example will be described in detail with reference to FIGS. 10 and 11. FIGS. 10 and 11 are explanatory views illustrating rendering according to the second specific example.

FIG. 10 is an explanatory view illustrating a system configuration example assumed in this specific example. As shown in FIG. 10, with the image processing system 1a assumed in this specific example, the sensor unit 110a is provided above the table 300a, and the image output unit 150a is provided obliquely above the table 300a. Also, an object 200b that is a vase with a flower is placed on the table 300a, and an actual shadow 420a of the object 200b is created by illumination from the image output unit 150a (an actual light source), as shown in FIG. 10.

FIG. 11 is an explanatory view illustrating an example of an output image that is output by the image output unit 150a according to this specific example, and the actual appearance when the table 300a is viewed from above in this specific example. When the actual shadow 420a is created in the real space by the output image, as shown in the left column in FIG. 11, the position of the actual shadow 420a is acquired by the sensing with the sensor unit 110a and the real space analysis with the analyzing portion 120. Then, the signal generating portion 140 generates a control signal for an image such that a virtual shadow 400b is displayed near the position of the actual shadow 420a, as shown in the middle column in FIG. 11, and the image output unit 150a outputs the image. The signal generating portion 140 may also generate a control signal for an image such that the virtual shadow 400b is displayed contacting the actual shadow 420a, as shown in the right column in FIG. 11, and the image output unit 150a may output the image. In the transition from the middle column in FIG. 11 to the right column in FIG. 11, the signal generating portion 140 may also generate a control signal for an image such that the virtual shadow 400b moves smoothly.

The analyzing portion 120 may recognize the type of object that the actual shadow 420a is from using image recognition, and the signal generating portion 140 may determine the shadow effect using content appropriate for the type of object. For example, in the example in FIG. 11, the actual shadow 420a is a shadow from a flower and a vase, so a shadow effect that displays the virtual shadow 400b of a butterfly is determined as the content appropriate for the flower and the vase.

Also, this specific example may be combined with the first specific example described above. For example, the signal generating portion 140 may generate a control signal for an image such that the virtual shadow 400b displayed near the actual shadow 420a moves near the virtual shadow 400a shown in the left column in FIG. 8. This configuration has the effect of indicating to the user (making the user aware) that a touch operation with respect to virtual shadow 400a is possible, by the movement of the virtual shadow 400b.

<2-3. Third Specific Example>

Figure 12:
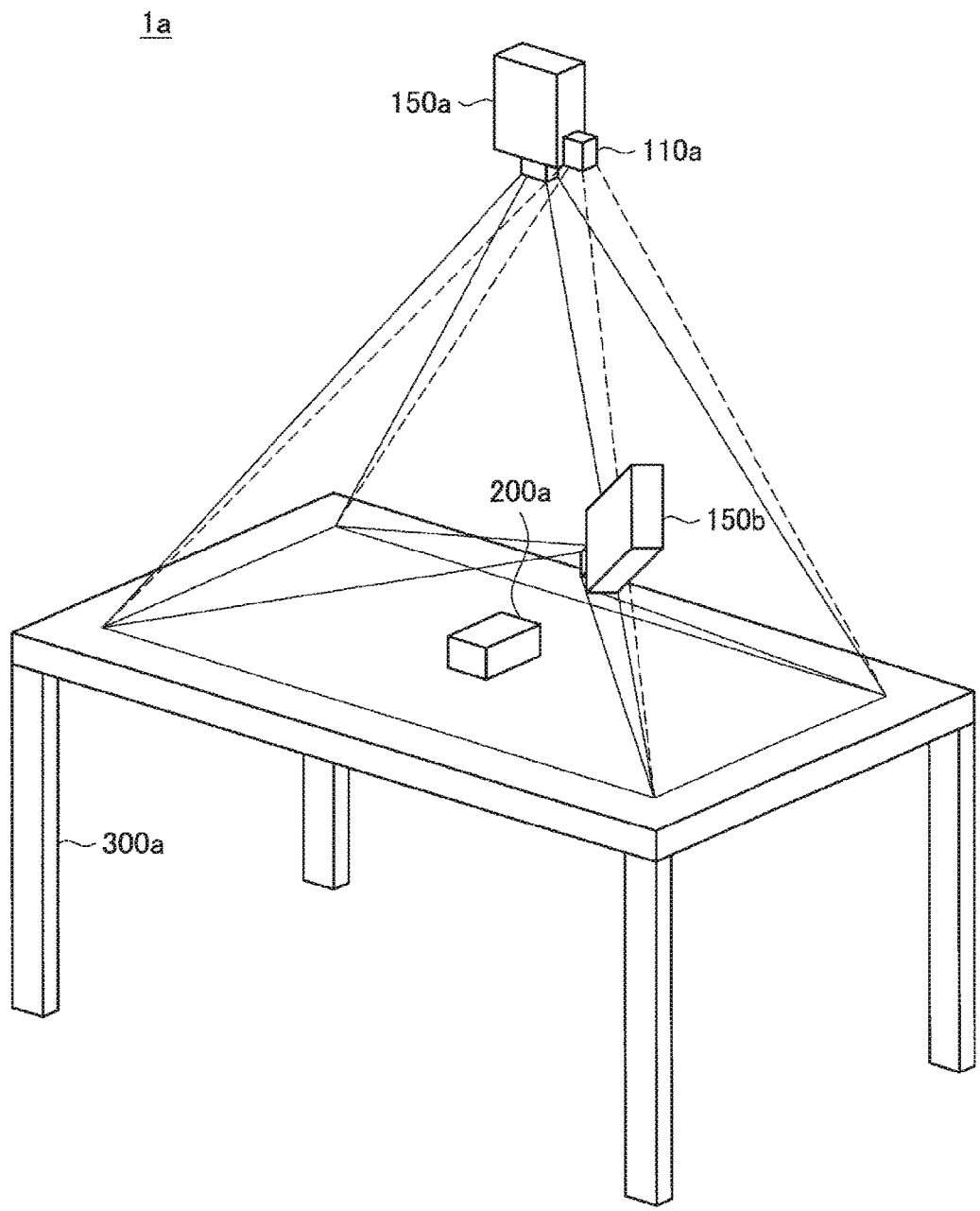
FIG. 12 is an explanatory view illustrating rendering according to a third specific example.

The image processing system 1 according to this specific example creates a virtual shadow effect in a real space in accordance with a three-dimensional shape of an object in a real space, and controls an illumination unit to illuminate the object in accordance with the three-dimensional shape. According to this configuration, the adjustment of how the light strikes the object, and the adjustment of the virtual shadow corresponding to the object are able to be easily performed separately. Hereinafter, this specific example will be described in detail with reference to FIGS. 12 and 13. FIGS. 12 and 13 are explanatory views illustrating rendering according to the third specific example.

FIG. 12 is an explanatory view illustrating a system configuration example assumed in this specific example. As shown in FIG. 10, with the image processing system 1a assumed in this specific example, the sensor unit 110a and the image output unit 150a are provided above the table 300a, similar to the image processing system 1a shown in FIG. 1. Also, the object 200a is placed on the table 300a. Moreover, with the image processing system 1a assumed in this specific example, an image output unit 150b is provided as an illumination unit obliquely above the table 300a.

FIG. 13 is an explanatory view illustrating an example of an output image that is output by the image output unit 150a according to this specific example, an output image that is output by the image output unit 150b, and the actual appearance when the table 300a is viewed from obliquely above. As shown in FIG. 13, the virtual shadow 400a is displayed by the output image output by the image output unit 150a, and the object 200a is illuminated by the output image output by the image output unit 150b. For example, the size (length) and color of the virtual shadow 400a, and the direction in which the shadow extends, can be adjusted by the signal generating portion 140 generating a control signal to change the output image from the image output unit 150a. Also, the brightness and color and the like of the light emitted onto the object 200a can be adjusted by the signal generating portion 140 generating a control signal to change the output image from the image output unit 150b. Accordingly, the adjustment of how the light strikes the object 200a, and the adjustment of the virtual shadow 400a corresponding to the object 200a, are able to be easily performed separately by the signal generating portion 140 generating the control signals separately.

The virtual shadow 400a may be displayed at a position appropriate for the positional relationship of the image output unit 150b and the object 200a. For example, the virtual shadow 400a may be displayed at a position on the opposite side from the image output unit 150b with respect to the object 200a. When the virtual shadow 400a is displayed as described above, the virtual shadow 400a appears to correspond to the light emitted onto the object 200a, so even more realistic rendering is possible.

Further, the image processing system 1a assumed in this specific example includes two image output units, so when a shadow (an actual shadow), not shown, is created by the effect of an output image from one of the image output units, the actual shadow is also able to be canceled out by an output image from the other image output unit.

<2-4. Fourth Specific Example>

Figure 14:
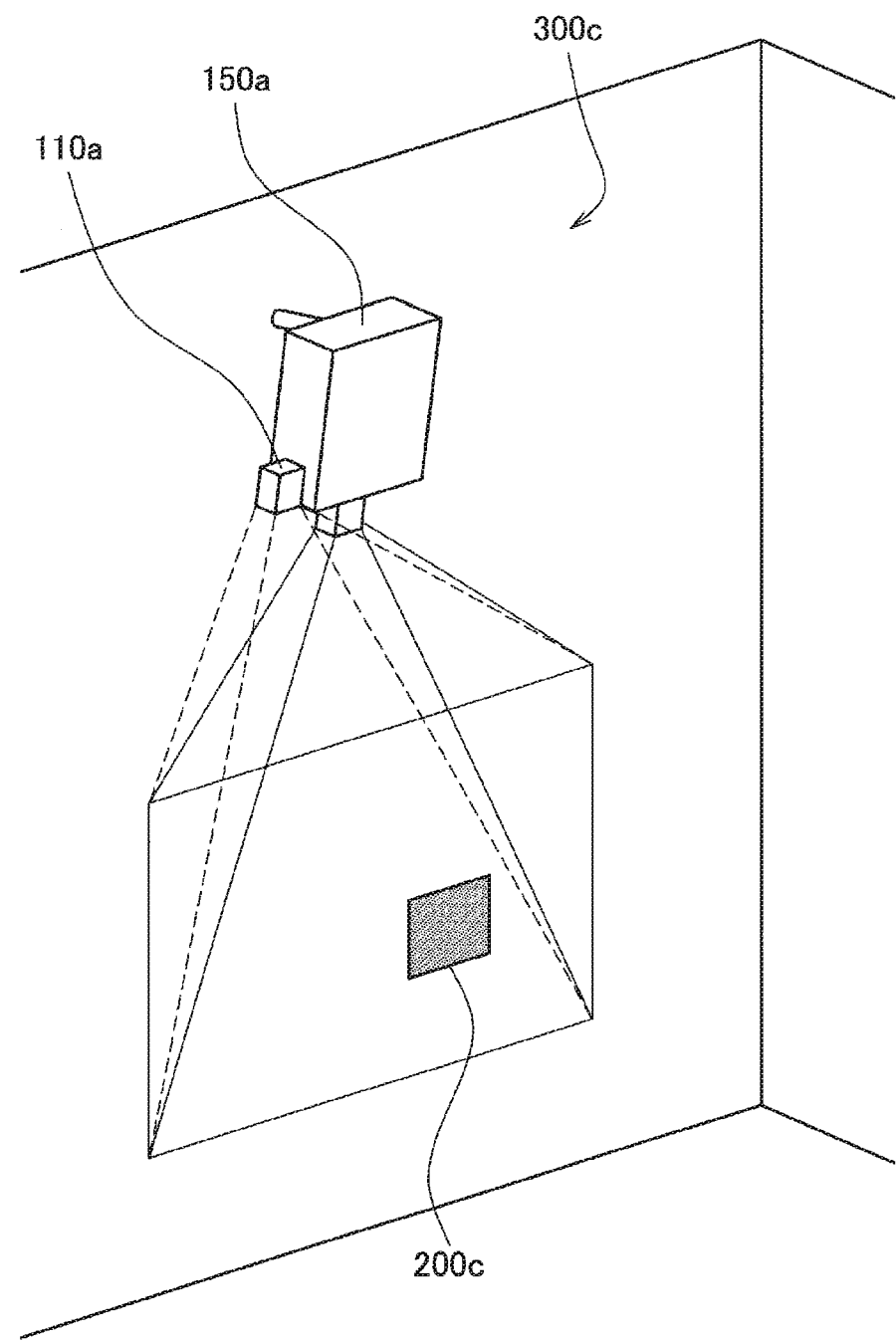
FIG. 14 is an explanatory view illustrating rendering according to a fourth specific example.
Figure 16:
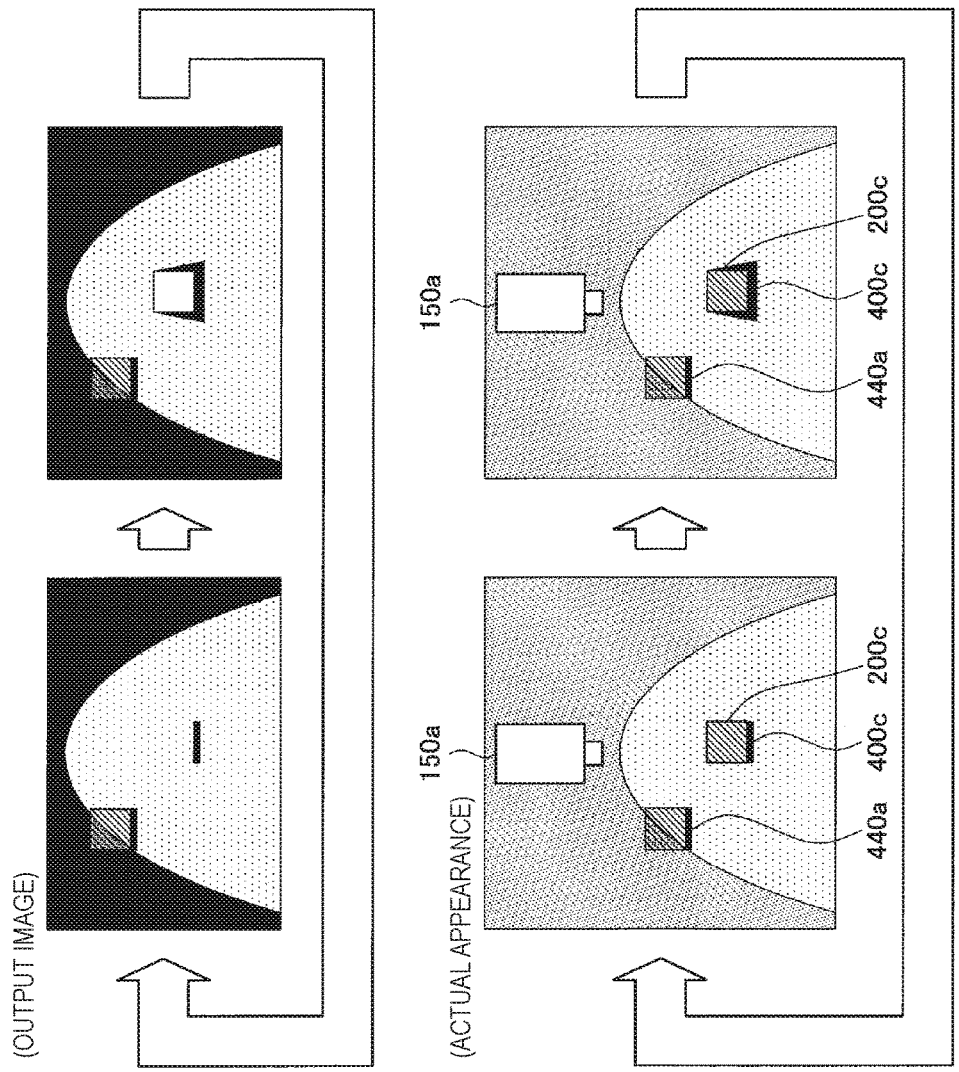
FIG. 16 is an explanatory view illustrating rendering according to a fourth specific example.

The image processing system 1 according to this specific example displays a virtual shadow corresponding to an object in the real space, in the real space, and illuminates the object and creates an illumination effect. Also, the image processing system 1 according to this specific example changes the size of the virtual shadow over time, and creates the illumination effect such that the brightness of the object changes in accordance with the change in the size of the virtual shadow. According to this configuration, it is possible to make it appear to the user as though an object that is actually not moving is moving. Hereinafter, this specific example will be described in detail with reference to FIGS. 14 to 16. FIGS. 14 and 16 are explanatory views illustrating rendering according to the fourth specific example.

FIG. 14 is an explanatory view illustrating a system configuration example assumed in this specific example. As shown in FIG. 14, with the image processing system 1a assumed in this specific example, the sensor unit 110a and the image output unit 150a are provided contacting a wall 300c that is a display surface for the image. Also, an object 200c that is a sticky note is affixed to the wall. In the example shown in FIG. 14, the sensor unit 110a is provided contacting the wall 300c, but the sensor unit 110a may also be provided facing the wall.

FIGS. 15 and 16 are explanatory views illustrating a transition example of an output image that is output by the image output unit 150a according to this specific example, and the actual appearance when the wall 300c is viewed from a direction perpendicular to the wall 300c. When there is a transition from a state in which light is not being emitted from the image output unit 150a (the left column in FIG. 15) to a state in which a spotlight-like light is emitted from the image output unit 150a (the middle column in FIG. 15), the wall 300c and the object 200c are illuminated, and the analyzing portion 120 is able to detect the object 200c. Also, the virtual shadow 400c is displayed in accordance with the object 200c, as shown in the middle column in FIG. 15. Here, the analyzing portion 120 may analyze the shape and color of the object 200c, and the image output unit 150a may display a virtual object 440a having the same shape and color as the object 200c, as shown in the right column in FIG. 15. The lower right region of the virtual object 440a may be displayed in the same color as the object 200c, and the upper left region of the virtual object 440a may be displayed darker than the object 200c, by the simulation that matches the shape of the spotlight-like light, as shown in the right column of FIG. 15. The virtual object 440a has the same shape and color as the actual object, and the state in which the virtual object 440a is affected by the spotlight-like light is reproduced, as described above, so more realistic rendering is possible compared to when just the virtual object is displayed on the wall.

In this specific example, the object 200c and the virtual object 440a are sticky notes, so characters and figures and the like may be projected onto the object 200c and the virtual object 440a by the image output unit 150a, and the object 200c and the virtual object 440a may be used as a UI for communication or notification.

Also, as shown in FIG. 16, in the output image from the image output unit 150, the size and shape of the virtual shadow 400c changes over time, and the output image from the image output unit 150 creates an illumination effect such that the brightness of the object 200c changes in accordance with the change in the virtual shadow 400c. According to this configuration, it is possible to realize animated rendering that makes it appear to the user as though the object 200c that is actually not moving is moving (shaking). By changing the size of the virtual shadow 400c, an effect is created which makes it appear as though the distance between the object 200c and the wall is changing, and by changing the brightness of the object 200c, an effect is created which makes it appear as though the angle of the object 200c with respect to the spotlight-like light is changing.

The animated rendering may be realized by simulating movement of an object that is actually not moving, for example. For example, the signal generating portion 140 may realize such animated rendering by generating a control signal for an image that dynamically creates a virtual shadow effect and an illumination effect on the basis of the shape of a simulated object and a virtual light source. Also, a plurality of illumination effects and virtual shadow effects with pre-designed shapes and movements may be prepared, and the virtual shadow effect and illumination effect may be selected and modified (size, inclination, aspect ratio, shadow density and the like) in accordance with analysis results of the shape, type, and size and the like of the object from the analyzing portion 120.

The animated rendering may be performed to draw the attention of the user (make the user aware) when there is a desire to notify the user, for example.

<<3. Modified Examples>>

Heretofore, an embodiment of the present disclosure has been described. Several modified examples of the embodiment are described below. The modified examples described below may be applied individually or in combination to the embodiment. Also, the modified examples may be applied instead of, or in addition to, the configuration described in the embodiment.

<3-1. First Modified Example>

Several virtual shadows are described above, but the virtual shadow displayed by the image processing system 1 according to the embodiment is not limited to the examples described above. FIG. 17 is an explanatory view illustrating an example of a variation of the virtual shadow. As shown in FIG. 17, the virtual shadow may have a variety of shapes in accordance with the parameters of the virtual light source and the three-dimensional shape of the object and the like. Also, the color of the virtual shadow is not limited to black and may have a gradation, or may include a variety of colors. The color of the virtual shadow may be determined in accordance with the parameters of the virtual light source. Also, the shape of the virtual shadow is not limited to a shape corresponding to the three-dimensional shape of the object, and may be a prepared shape or a shape in which a prepared shape is deformed.

Also, a plurality of virtual shadows may be displayed simultaneously. The plurality of virtual shadows may be displayed on the basis of the same virtual light source parameters, or may be displayed on the basis of virtual light source parameters that are different for each virtual shadow.

<3-2. Second Modified Example>

Several virtual light sources are described above, but the virtual light source displayed by the image processing system 1 according to the embodiment is not limited to the examples described above. A variation of the virtual light source is described below with reference to FIGS. 18 to 22. FIGS. 18 to 22 are explanatory views illustrating a variation of the virtual light source.

For example, in the first specific example described with reference to FIG. 7, an example in which light is illuminated over an entire display area other than the virtual shadow is described, but light may also be illuminated on only a portion of the display area. Also, the region illuminated with the light from the virtual light source may be trimmed in accordance with an object serving as an illuminated surface.

Figure 18:
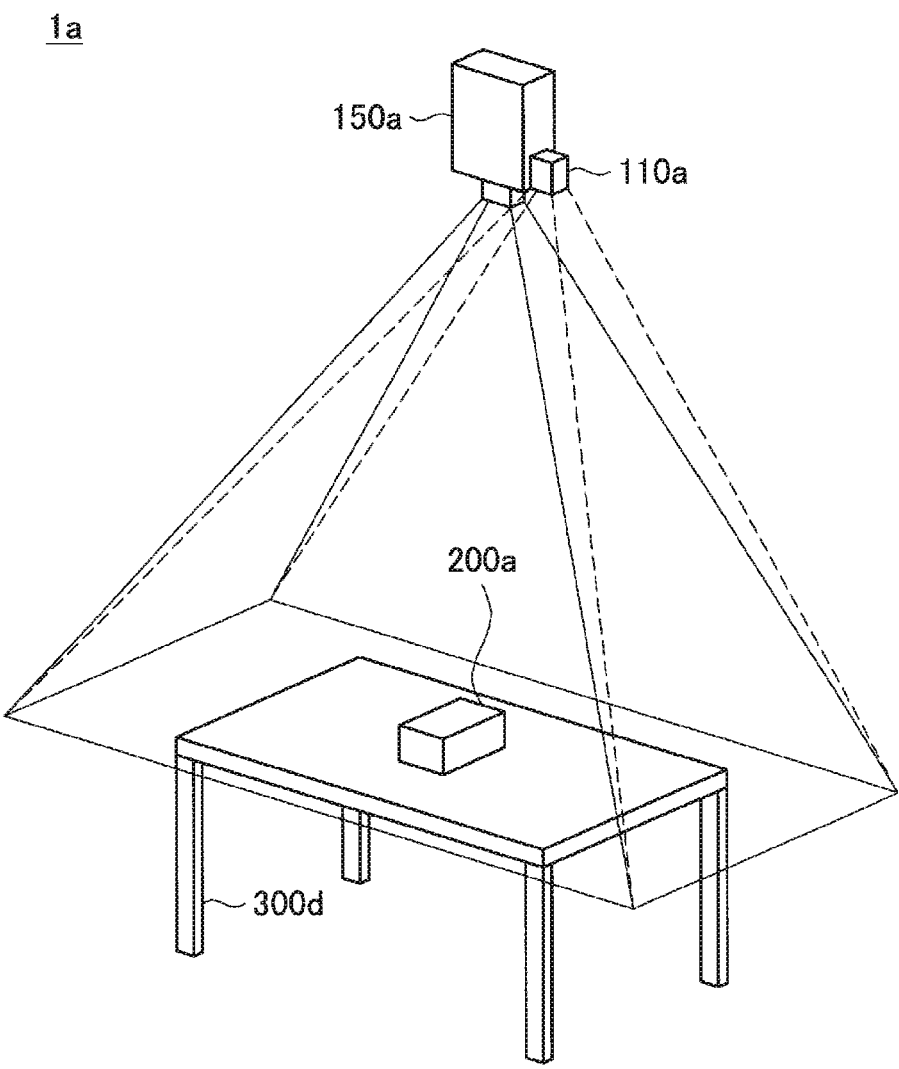
FIG. 18 is an explanatory view illustrating a variation of a virtual light source according to a second modified example.

There may be cases in which a table 300*d* that is a light illuminated surface is smaller than the illumination region of the image output unit 150*a*, as shown in FIG. 18. In such a case, the output image from the image output unit 150*a* may be trimmed in accordance with the shape of the table 300*d* serving as the surface illuminated with light, as shown in FIG. 19, for example.

Also, the region illuminated with light from the virtual light source is not limited to an example in which it is illuminated evenly. The example shown in the upper part of FIG. 20 is an example in which light coming in through a window is represented by displaying light from a virtual light source like a window frame. Also, light filtering through leaves that comes in through a window may also be represented by simulating a tree outside the window, as in the example shown in the lower left part of FIG. 20. Further, light coming in through a window with waterdrops on it may be represented when the weather is rainy, as in the example shown in the lower right part of FIG. 20. Weather information may be reflected in the virtual light source by acquiring weather information at present or at an arbitrary time from an external server via the communication portion 180.

Figure 21:
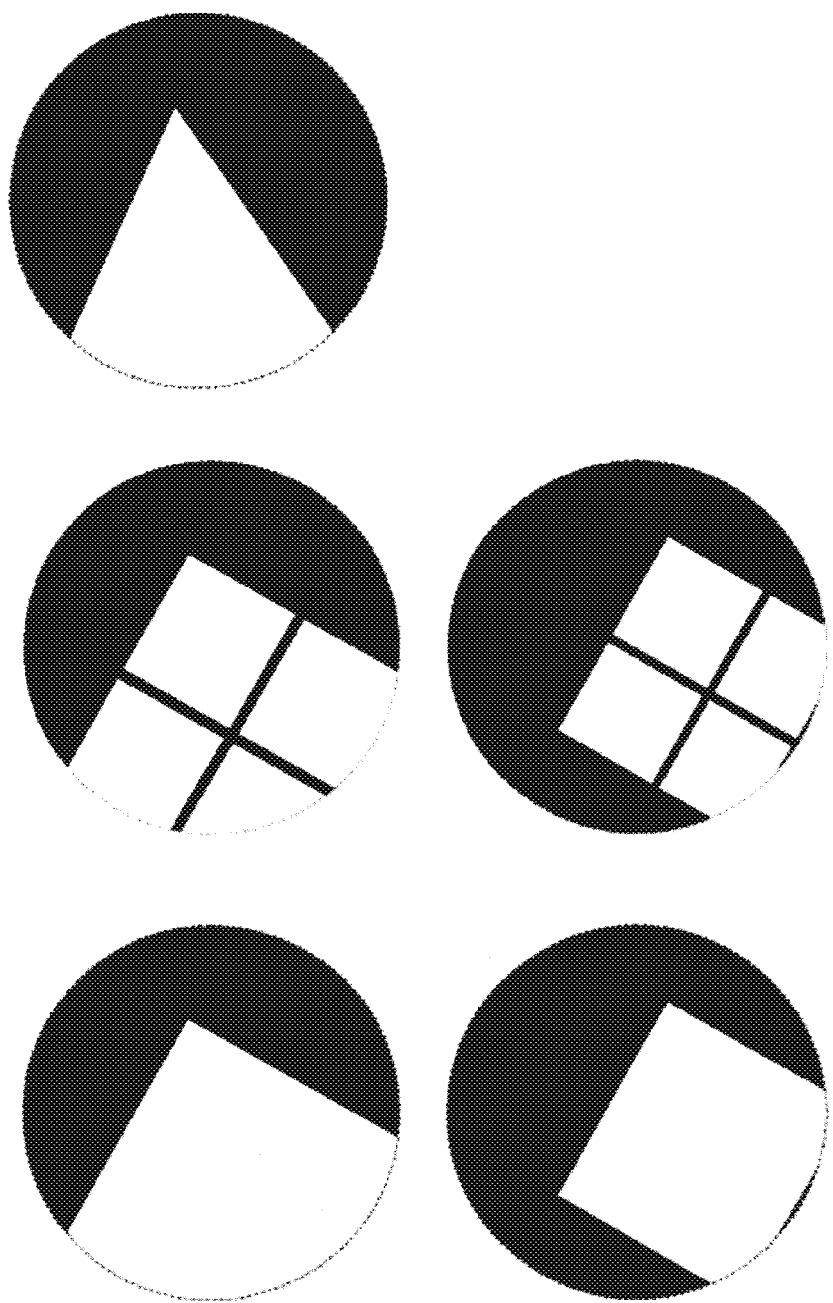
FIG. 21 is an explanatory view illustrating a variation of a virtual light source according to a second modified example.
Figure 22:
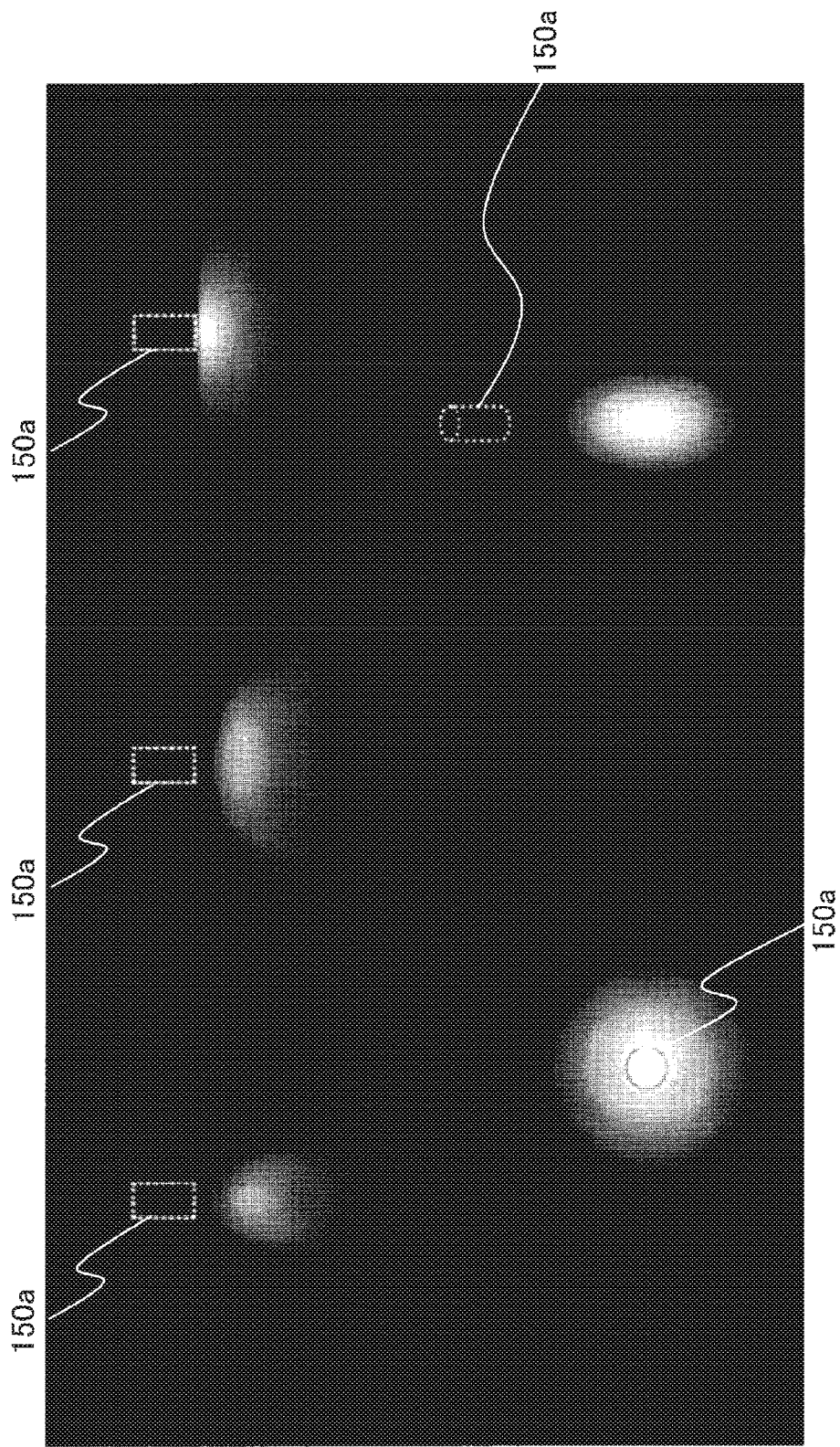
FIG. 22 is an explanatory view illustrating a variation of a virtual light source according to a second modified example.

Also, the shape of the output image to be trimmed is not limited to the example described above. For example, if a table that serves as the surface illuminated with light is circular, the shape of the output image may be trimmed in a circular shape, as shown in FIG. 21.

Also, in the fourth specific example, an example of a virtual light source that emits spotlight-like light is described, but the shape of the spotlight is not limited to the shape described above. The spotlight-like light that is emitted by the image processing system 1 according to the present disclosure may have any one of a variety of shapes, as shown in the upper part of FIG. 22. Also, the spotlight-like light may also have any one of a variety of shapes in accordance with the positional relationship of the illuminated surface and the image output unit 150*a*, as shown in the lower part of FIG. 22.

<3-3. Third Modified Example>

Figure 23:
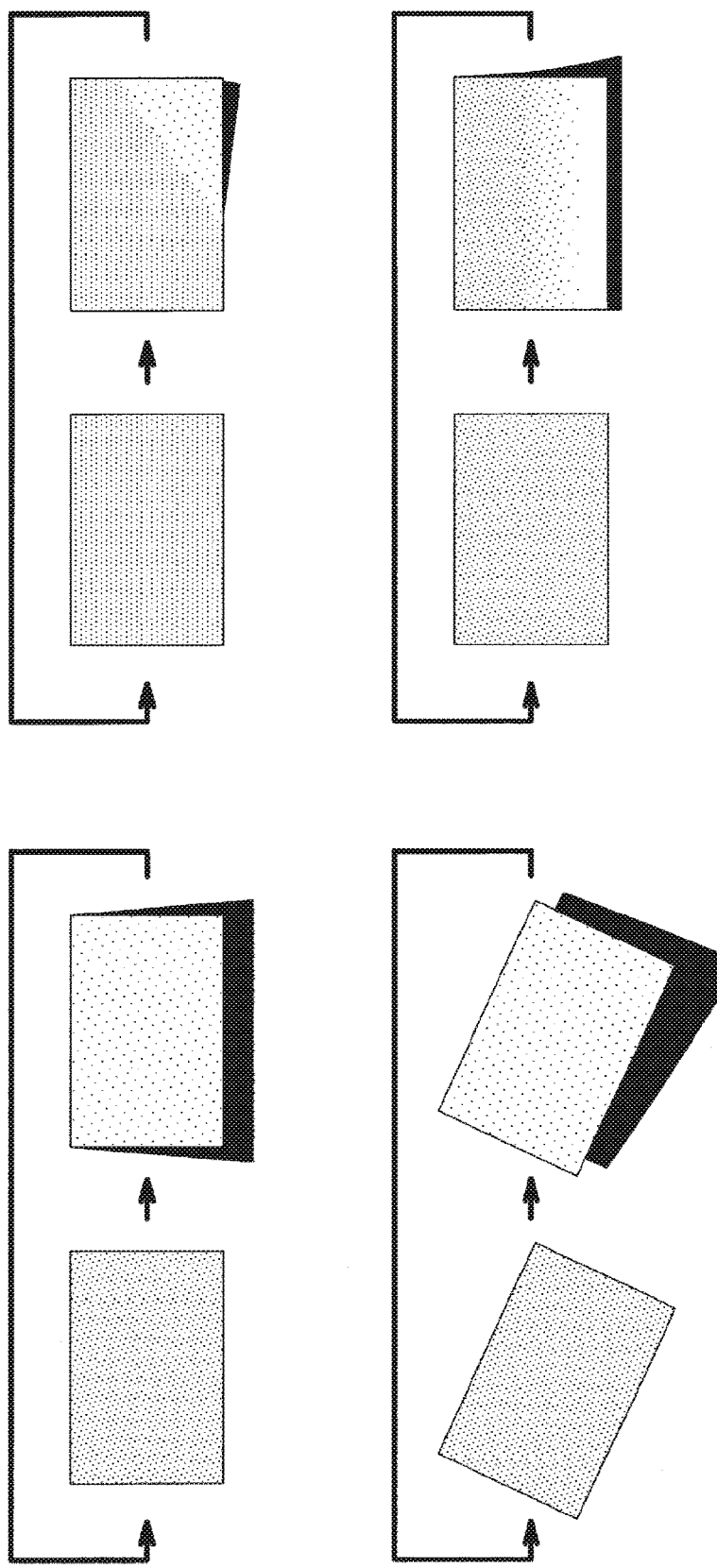
FIG. 23 is an explanatory view illustrating a variation of animated rendering according to a third modified example.

In the fourth specific example, animated rendering that makes an object that is actually not moving appear as though it is moving is described, as described with reference to FIG. 16, but animated rendering according to the present disclosure is not limited to this example. FIG. 23 is an explanatory view illustrating an example of a variation of the animated rendering according to the present disclosure.

Animated rendering that makes an entire object (a sticky note) appear as though it is moving may be performed, as shown in the upper left part of FIG. 23, or animated rendering that makes a portion of an object appear as though it is moving may be performed, as shown in the upper right part of FIG. 23. Also, animated rendering of a virtual shadow appropriate for the positional relationship of the shape of the object and the virtual light source may be performed, as shown in the lower left part of FIG. 23. Also, animated rendering that makes the shape of an object appear as though it is changing may be performed, as shown in the lower right part of FIG. 23. An effect is created in which an object (a sticky note) appears as though it is changing shape as if being peeled away, by having the illumination effect on the object be brighter lower down, in addition to having the virtual shadow be distorted.

<<4. Hardware Configuration Example>>

Heretofore, an embodiment and various modified examples of the present disclosure have been described. Information processing such as the real space analysis processing, the shadow effect determination processing, and the signal generation processing and the like described above is realized through the cooperation of software, and the hardware of the image processing apparatus 10 described below.

Figure 24:
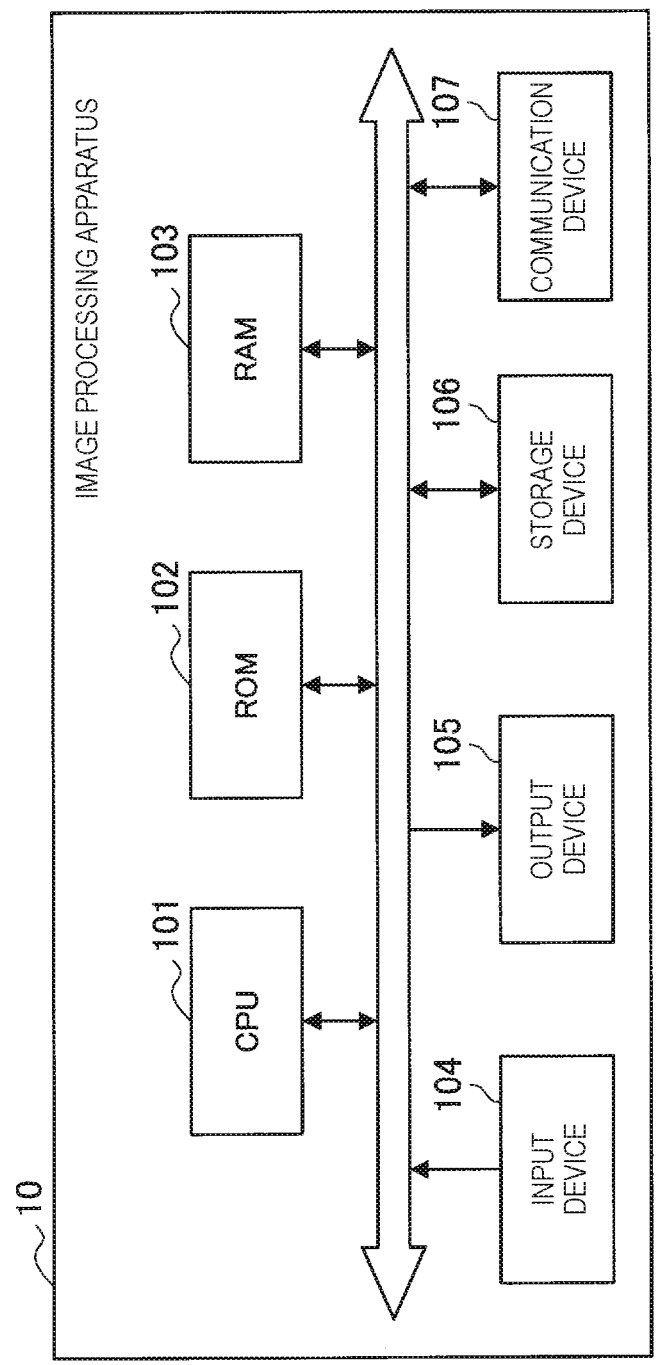
FIG. 24 is an explanatory view illustrating a hardware configuration example.

FIG. 24 is an explanatory view illustrating a hardware configuration of the image processing apparatus 10. As shown in FIG. 24, the image processing apparatus 10 includes a central processing unit (CPU) 101, read only memory (ROM) 102, random access memory (RAM) 103, an input device 104, an output device 105, a storage device 106, and a communication device 107.

The CPU 101 functions as an operation processing device and a control device, and controls the overall operation in the image processing apparatus 10 in accordance with various programs. The CPU 101 may also be a microprocessor. The ROM 102 stores programs and operation parameters and the like used by the CPU 101. The RAM 103 temporarily stores programs used in the execution by the CPU 101 and parameters and the like that change appropriately in that execution. These are connected together by a host bus formed by a CPU bus or the like. The functions of the analyzing portion 120, the real space information input portion 130, the signal generating portion 140, and the parameter setting portion 170 are realized mainly through software working in cooperation with the CPU 101, the ROM 102, and the RAM 103.

The input device 104 includes inputting means, such as a mouse, a keyboard, a touch panel, a button, a microphone, a switch, and a lever, for the user to input data, and an input control circuit that generates an input signal on the basis of input by the user, and outputs the generated input signal to the CPU 101, and the like. The user of the image processing apparatus 10 is able to input various kinds of data and direct processing operations with respect to the image processing apparatus 10, by operating the input device 104. The input device 104 corresponds to the parameter operating portion 160 described with reference to FIG. 4.

The output device 105 includes a display device such as a liquid crystal display (LCD) device, an OLED device, and a lamp. Furthermore, the output device 105 includes audio output device such as a speaker and headphones. For example, the display device displays a captured image or a generated image or the like. In contrast, the audio output device converts audio data and the like into sound, which is then outputted.

The storage device 106 is a device for storing data. The storage device 106 may include a storage medium, a storage device that stores data in a storage medium, a readout device that reads out data from a storage medium, and a deletion device that deletes data stored in a storage medium, and the like. The storage device 106 stores various kinds of data and programs executed by the CPU 101.

The communication device 107 is a communication interface formed by a communication device for connecting to a network, for example. Also, the communication device 107 may include a wireless local area network (LAN) compatible communication device, a Long-Term Evolution (LTE) compliant communication device, a wired communication device that performs wired communication via a wire, or a Bluetooth communication device. The communication device 107 corresponds to the communication portion 180 described with reference to FIG. 4.

<<5. Summary>>

As described, above, according to the embodiment of the present disclosure, a virtual shadow effect is created in a real space on the basis of real space information, so even more realistic rendering is possible. Also, the virtual shadow effect is able to be created with simpler equipment compared to when a shadow effect is created by an actual light source.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, an example is described in which the analyzing portion 120 functions as a real space information acquiring portion that obtains space information by analyzing the sensing results from the sensor unit 110, but the present technology is not limited to this example. For example, the sensor unit 110 may include a pressure sensor, and the sensor unit 110 may be regarded to function as a real space information acquiring portion when the output of the sensor unit 110 directly indicates space information such as positional information of an object.

Also, in the embodiment described above, examples are described in which a camera and a stereo camera, and a touch panel having a pressure sensor, and the like, are used as the sensor unit, by the present technology is not limited to these examples. For example, the sensor unit may include a sensor capable of sensing the transparency of an object. When the sensor unit includes a sensor capable of sensing the transparency of an object, the signal generating portion may determine a shadow effect to make the virtual shadow transparent in accordance with the sensed transparency of the object. A radio wave-type sensor or an acoustic wave-type sensor that senses the material of the object, for example, may be used as the sensor that is capable of sensing the transparency of an object. Also, the sensor unit may include an ambient light sensor that senses the intensity and direction and the like of ambient light. When the sensor unit includes an ambient light sensor, the signal generating portion may determine a virtual shadow effect so that the shadow becomes a natural shadow that matches the intensity and direction of the ambient light, or may determine a virtual shadow effect so that the shadow becomes a noticeable shadow that is inconsistent with the intensity and direction of the ambient light, for example.

Also, in the embodiment described above, an example is described in which a touch operation based on the detection of a touch position of the user is used as an operation by the user, but the operation by the user that is used with the present technology is not limited to this example. For example, the operation by the user may be a pointing operation with respect to a real space or a virtual space. Aside from the touch operation exemplified in the embodiment, the pointing operation may be, for example, a finger pointing operation, an eye gaze operation, a pointing operation using a cursor position, or a pointing operation using a laser pointer. A finger pointing operation is an operation of pointing to a location by the direction that an operating body is facing, for example. Also, an eye gaze operation is an operation of pointing to a location that the user is presumed to be looking at from the direction in which the user is looking, for example. Further, a pointing direction using a cursor is, for example, an operation of moving a cursor in a real space or a virtual space in accordance with a movement of an operating body, and pointing to a location where the position of the cursor is in a real space. A pointing operation using a laser pointer is an operation of pointing to a location illuminated by the laser pointer. Operational information indicative of such an operation by the user may be acquired as real space information by the sensor unit or the analyzing portion, and inputted to the real space information input portion, for example.

Also, according to the embodiment, it is also possible to provide a computer program for causing hardware such as the CPU 101, the ROM 102, and the RAM 103 to display functions equivalent to the functions of the components of the image processing apparatus 10 described above. Further, a storage medium within which the computer program is stored is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

a real space information input portion into which information about a real space is input; and a signal generating portion that generates a control signal for an image that creates a virtual shadow effect in the real space on the basis of the information about the real space.

(2)

The image processing apparatus according to (1), in which the information about the real space includes object information relating to an object in the real space, and the image creates the virtual shadow effect in accordance with the object information.

(3)

The image processing apparatus according to (2), in which the image creates the virtual shadow effect corresponding to a parameter of a virtual light source.

(4)

The image processing apparatus according to (3), in which the object information includes information indicative of a position of the object, and the image creates the virtual shadow effect in accordance with the position of the object in the real space.

(5)

The image processing apparatus according to (4), in which the parameter of the virtual light source includes a value related to at least one of a light source characteristic, a position of the light source, a direction of light emitted from the light source, a range of light emitted from the light source, a color of light emitted from the light source, and a brightness of light emitted from the light source.

(6)

The image processing apparatus according to (4) or (5), in which the object information further includes information indicative of a three-dimensional shape of the object, and the image creates the virtual shadow effect in accordance with the three-dimensional shape of the object in the real space.

(7)

The image processing apparatus according to (6), in which the signal generating portion further generates a control signal to control an illumination unit to illuminate the object in accordance with the three-dimensional shape of the object.

(8)

The image processing apparatus according to (2), in which the information about the real space includes information indicative of an operation by a user in the real space, and the virtual shadow effect changes on the basis of the operation by the user.

(9)

The image processing apparatus according to (8), in which the operation by the user is a pointing operation with respect to the real space or a virtual space.

(10)

The image processing apparatus according to (9), in which the pointing operation is a pointing operation with respect to the object.

(11)

The image processing apparatus according to (9) or (10), in which the pointing operation is a pointing operation with respect to a virtual shadow created in the real space by the image.

(12)

The image processing apparatus according to any one of (9) to (11), in which the pointing operation includes at least one of a touch operation, a finger pointing operation, an eye gaze operation, a pointing operation using a cursor, and a pointing operation using a laser pointer.

(13)

The image processing apparatus according to any one of (1) to (12), in which the information about the real space includes information indicative of a position of a shadow created in the real space by an actual light source, and the image creates the virtual shadow effect at a position corresponding to the position of the shadow created by the actual light source.

(14)

The image processing apparatus according to any one of (1) to (13), in which a size of a virtual shadow created in the real space by the image changes over time.

(15)

The image processing apparatus according to (14), in which the virtual shadow is a shadow corresponding to an object in the real space, the signal generating portion further generates a control signal for an image that illuminates the object and creates an illumination effect, and a brightness of the illumination effect changes in accordance with the change in the size of the virtual shadow.

(16)

The image processing apparatus according to any one of (1) to (15), further including:

a real space information acquiring portion that acquires the information about the real space.

(17)

An image processing method including:

inputting information about a real space; and causing a processor to generate a control signal for an image that creates a virtual shadow effect, on the basis of the information about the real space.

(18)

A program that causes a computer to perform:

a process of inputting information about a real space; and a process of generating a control signal for an image that creates a virtual shadow effect, on the basis of the information about the real space.

REFERENCE SIGNS LIST

1 image processing system
10 image processing apparatus 110 sensor unit
120 analyzing portion
130 real space information input portion
140 signal generating portion
150 image output unit
160 parameter operating portion
170 parameter setting portion
180 communication portion
200 object
400 virtual shadow

The invention claimed is:

1. An image processing apparatus, comprising:
at least one sensor unit configured to acquire information about a real space; and
a central processing unit (CPU) configured to:
set a parameter of a virtual light source;
receive the information about the real space from the at least one sensor unit;
generate a first control signal for a first image based on the information about the real space and the parameter of the virtual light source;
generate a virtual shadow effect of the first image based on the first control signal;
output the virtual shadow effect of the first image on the real space, wherein the outputted virtual shadow effect of the first image is displayed on the real space; and
control the virtual shadow effect to display content which is related to an object in the real space.

2. The image processing apparatus according to claim 1, wherein
the information about the real space includes object information associated with the object in the real space, and
the first image creates the virtual shadow effect based on the object information.

3. The image processing apparatus according to claim 2, wherein
the object information includes information indicative of a position of the object, and
the first image creates the virtual shadow effect based on the position of the object in the real space.

4. The image processing apparatus according to claim 3, wherein
the parameter of the virtual light source includes a value associated with at least one of a light source characteristic, a position of the light source, a direction of light emitted from the light source, a range of light emitted from the light source, a color of light emitted from the light source, or a brightness of light emitted from the light source.

5. The image processing apparatus according to claim 3, wherein
the object information further includes information indicative of a three-dimensional shape of the object, and
the first image creates the virtual shadow effect based on the three-dimensional shape of the object in the real space.

6. The image processing apparatus according to claim 5, wherein the CPU is further configured to generate a second control signal to control an illumination unit to illuminate the object based on the three-dimensional shape of the object.

7. The image processing apparatus according to claim 2, wherein
the information about the real space includes information indicative of a user operation in the real space, and
the virtual shadow effect changes based on the user operation.

8. The image processing apparatus according to claim 7, wherein the user operation is a pointing operation with respect to the real space or a virtual space.

9. The image processing apparatus according to claim 8, wherein the pointing operation includes at least one of a touch operation, a finger pointing operation, an eye gaze operation, a pointing operation based on a cursor, or a pointing operation based on a laser pointer.

10. The image processing apparatus according to claim 7, wherein the user operation is a pointing operation with respect to the object.

11. The image processing apparatus according to claim 7, wherein the user operation is a pointing operation with respect to a virtual shadow of the first image in the real space.

12. The image processing apparatus according to claim 1, wherein
the information about the real space includes information indicative of a position of a shadow of an actual light source in the real space, and
wherein the CPU is further configured to generate the virtual shadow effect at a position corresponding to the position of the shadow created by the actual light source.

13. The image processing apparatus according to claim 1, wherein the CPU is further configured to change a size of a virtual shadow of the first image in the real space based on change in time.

14. The image processing apparatus according to claim 13, wherein
the virtual shadow is a shadow corresponding to the object in the real space,
the CPU is further configured to:
generate a third control signal for a second image that illuminates the object and creates an illumination effect, and
control an illumination unit to change a brightness of the illumination effect based on the change in the size of the virtual shadow.

15. An image processing method, comprising:
acquiring information about a real space;
setting a parameter of a virtual light source;
receiving the information about the real space;
generating a control signal for an image based on the information about the real space and the parameter of the virtual light source;
generating a virtual shadow effect of the image based on the control signal;
outputting the virtual shadow effect of the image on the real space, wherein the outputted virtual shadow effect of the image is displayed on the real space; and
controlling the virtual shadow effect to display content which is related to an object in the real space.

16. A non-transitory computer-readable medium having stored thereon, computer-executable instructions which when executed cause a computer to execute operations, the operations comprising:
acquiring information about a real space;
setting a parameter of a virtual light source;
receiving the information about the real space;
generating a control signal for an image based on the information about the real space and the parameter of the virtual light source;

generating a virtual shadow effect of the image based on the control signal;
outputting the virtual shadow effect of the image on the real space, wherein the outputted virtual shadow effect of the image is displayed on the real space; and
controlling the virtual shadow effect to display content which is related to an object in the real space.

\* \* \* \* \*